United States Patent
Smyth et al.

(10) Patent No.: US 11,175,521 B2
(45) Date of Patent: Nov. 16, 2021

(54) DRIVE SCHEMES FOR TRANSPARENT TUNABLE OPTICAL ELEMENTS

(71) Applicant: Facebook Technologies, LLC, Menlo Park, CA (US)

(72) Inventors: Katherine Marie Smyth, Seattle, WA (US); Spencer Allan Wells, Seattle, WA (US); Robin Sharma, Redmond, WA (US); Andrew John Ouderkirk, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 343 days.

(21) Appl. No.: 16/431,164

(22) Filed: Jun. 4, 2019

(65) Prior Publication Data

US 2020/0387014 A1   Dec. 10, 2020

(51) Int. Cl.
*G02F 1/03* (2006.01)
*G02F 1/07* (2006.01)
*G02B 27/01* (2006.01)
*G02F 1/01* (2006.01)

(52) U.S. Cl.
CPC .......... *G02F 1/03* (2013.01); *G02B 27/0172* (2013.01); *G02F 1/0102* (2013.01); *G02F 1/07* (2013.01); *G02B 2027/0178* (2013.01); *G02F 1/0121* (2013.01); *G02F 2201/12* (2013.01)

(58) Field of Classification Search
CPC .... G02F 1/0121; G02F 1/0102; G02F 1/0128; G02F 1/0131; G02F 2201/12; G02B 27/0172; G02B 2027/0178; H01L 29/00; G06F 3/00
See application file for complete search history.

(56) References Cited

U.S. PATENT DOCUMENTS

2011/0163403 A1   7/2011   Bhatia et al.
2012/0128960 A1   5/2012   Büsgen et al.
(Continued)

FOREIGN PATENT DOCUMENTS

TW   202103517 A   1/2021
WO   2010/015093 A1   2/2010
WO   2018/091359 A1   5/2018
(Continued)

OTHER PUBLICATIONS

"Low-Noise and Drift-Free Piezo Amplifiers", URL: https://www.pi-usa.us/en/apps-tech/technology/controllers-software/piezo-controllers-piezo-drivers/, as accessed on Mar. 13, 2019, 9 pages.
(Continued)

*Primary Examiner* — Darryl J Collins
*Assistant Examiner* — Tamara Y. Washington
(74) *Attorney, Agent, or Firm* — FisherBroyles, LLP

(57) ABSTRACT

A transparent optical element includes a primary electrode, a secondary electrode overlapping at least a portion of the primary electrode, an electroactive layer disposed between and abutting the primary electrode and the secondary electrode, and a control system operably coupled to at least one of the primary electrode and the secondary electrode and adapted to provide a drive signal to actuate the electroactive layer within an aperture of the transparent optical element.

19 Claims, 20 Drawing Sheets

(56) References Cited

U.S. PATENT DOCUMENTS

| | | | |
|---|---|---|---|
| 2013/0100363 A1* | 4/2013 | Kakinuma | H04N 13/341 349/13 |
| 2019/0113977 A1 | 4/2019 | Kim et al. | |

FOREIGN PATENT DOCUMENTS

| | | | | |
|---|---|---|---|---|
| WO | 2018/091749 A1 | 5/2018 | | |
| WO | WO-2018091359 A1 * | 5/2018 | | H01L 33/505 |
| WO | 2020/247171 A1 | 12/2020 | | |

OTHER PUBLICATIONS

Yi et al., "A Charge Controller for Linear Operation of a Piezoelectric Stack Actuator", IEEE Transactions on Control Systems Technology, vol. 13, No. 4, Jul. 2005, pp. 517-526.

Rios et al., "Design of a Charge Drive for Reducing Hysteresis in a Piezoelectric Bimorph Actuator", IEEE/ASME Transactions on Mechatronics, vol. 21, No. 1, Feb. 2016, pp. 51-54.

Seeger et al., "Charge Control of Parallel-Plate, Electrostatic Actuators and the Tip-in Instability", Journal of Microelectromechanical Systems, vol. 12, No. 5, Oct. 2003, pp. 656-671.

"Basic Designs of Piezoelectric Positioning Elements: Benders, Bimorph, Disks", URL: https://www.pi-usa.us/en/products/piezo-motors-stages-actuators/piezo-motion-control-tutorial/tutorial-4-41/, as accessed on May 19, 2019, pp. 1-3.

Rios et al., "A new electrical configuration for improving the range of piezoelectric bimorph benders", Sensors and Actuators A: Physical, 224, 2015, pp. 106-110.

Rakotondrabe et al., "Simultaneous displacement/force self-sensing in piezoelectric actuators and applications to robust control", IEEE/ASME Transactions on Mechatronics, vol. 20, No. 2, 2015, pp. 1-12.

Yong et al., "A Novel Piezoelectric Strain Sensor for Simultaneous Damping and Tracking Control of a High-Speed Nanopositioner", IEEE/ASME Transactions on Mechatronics, vol. 18, No. 3, Jun. 2013, pp. 1113-1121.

Zhao et al., "Observation of an unusual optical switching effect in relaxor ferroelectrics Pb (Mg1/3Nb2/3) O3-Pb (Zr0.53,Ti0.47)O3 transparent ceramics", Applied Physics Letters, vol. 104, No. 6, Feb. 12, 2014, 8 pages.

"World's Most Efficient Haptic Piezo Driver IC", Boreas Technologies, URL: https://www.boreas.ca/, as accessed on May 15, 2019, pp. 1-4.

International Search Report and Written Opinion received for PCT Application Serial No. PCT/US2020/033531 dated Aug. 5, 2020, 13 pages.

* cited by examiner

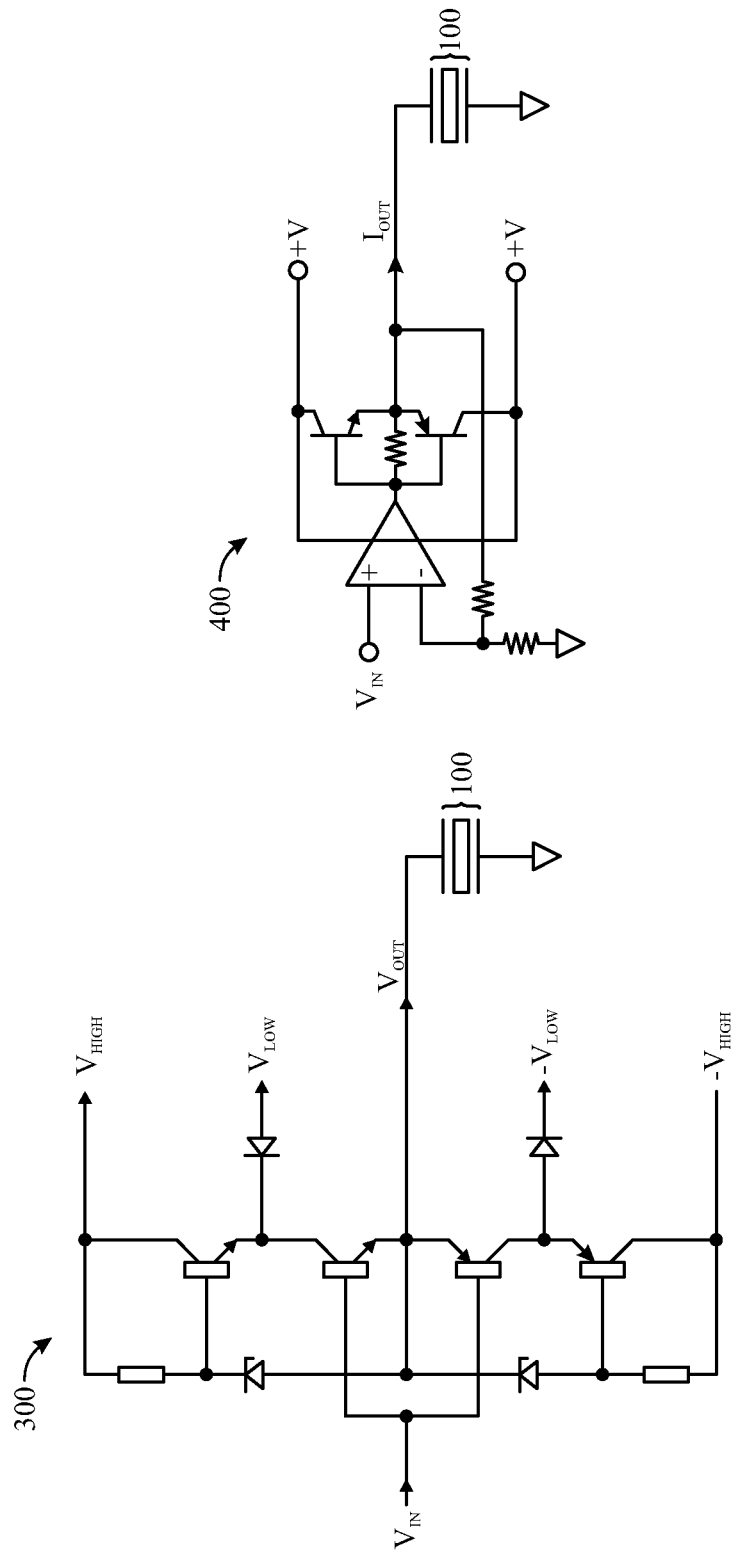

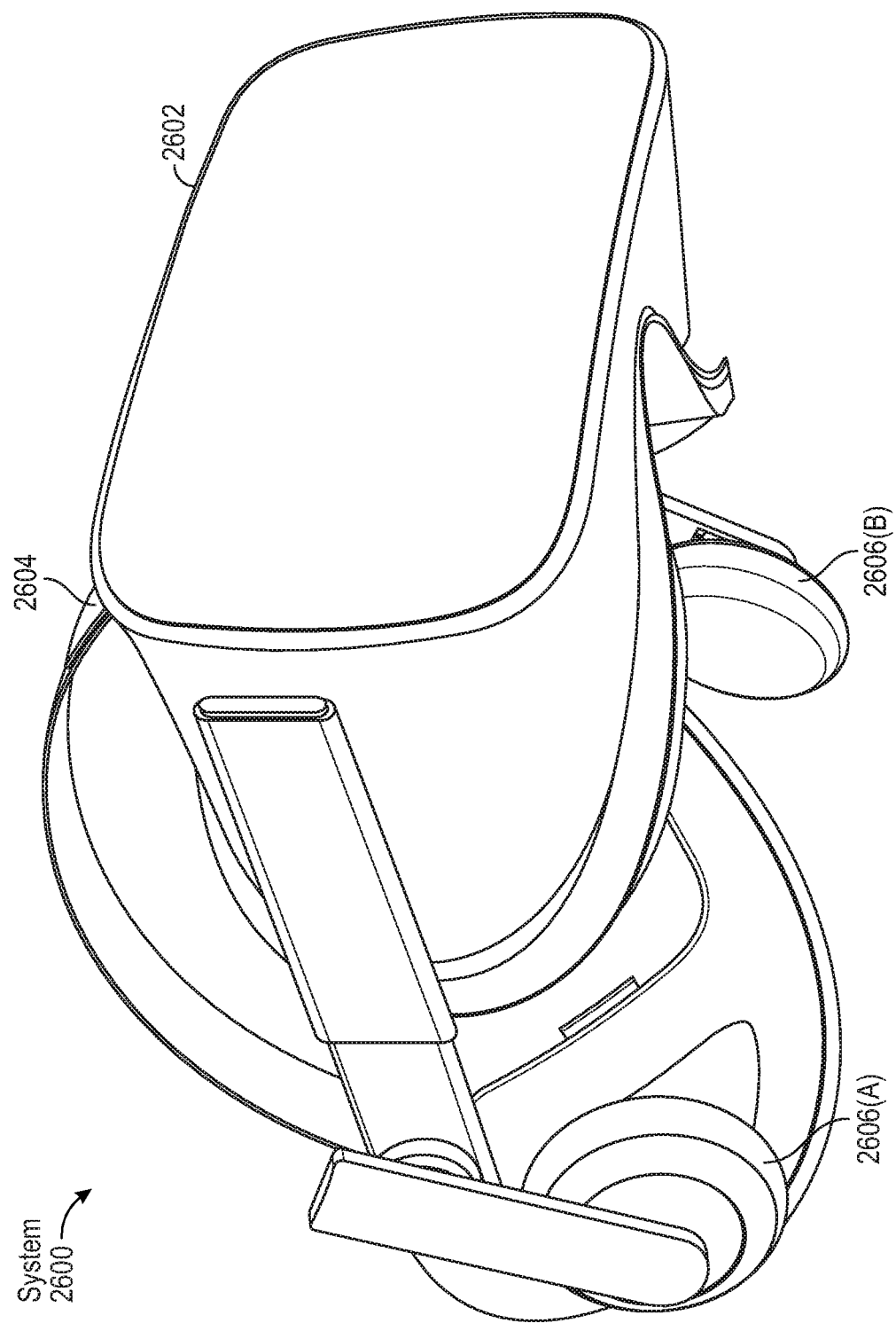

DRIVE SCHEMES FOR TRANSPARENT TUNABLE OPTICAL ELEMENTS

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 3 shows a transparent optical element electrically connected to a Class G/H amplifier according to some embodiments.

FIG. 4 shows an operational amplifier (op-amp) integrated with a Class B amplifier and connected to a transparent optical element according to certain embodiments.

FIG. 26 is an illustration of an exemplary virtual-reality headset that may be used in connection with embodiments of this disclosure.

Figure 1:
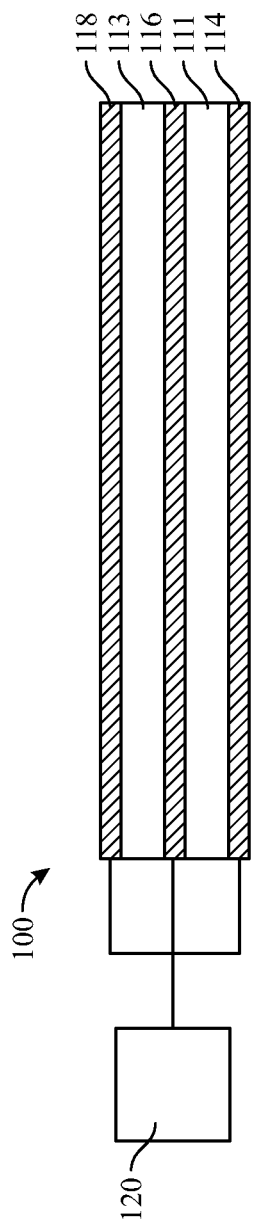
FIG. 1 is a schematic illustration of a transparent bimorph actuator electrically connected to a control system according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Polymeric and other dielectric materials may be incorporated into a variety of different optic and electro-optic device architectures, including active and passive optics and electroactive devices. Electroactive polymer (EAP) materials, for instance, may change their shape under the influence of an electric field. EAP materials have been investigated for use in various technologies, including actuation, sensing and/or energy harvesting. Lightweight and conformable, electroactive polymers may be incorporated into wearable devices such as haptic devices and are attractive candidates for emerging technologies including virtual reality/augmented reality devices where a comfortable, adjustable form factor is desired.

Virtual reality and augmented reality eyewear devices or headsets, for instance, may enable users to experience events, such as interactions with people in a computer-generated simulation of a three-dimensional world or viewing data superimposed on a real-world view. Virtual reality/augmented reality eyewear devices and headsets may also be used for purposes other than recreation. For example, governments may use such devices for military training, medical professionals may use such devices to simulate surgery, and engineers may use such devices as design visualization aids.

These and other applications may leverage one or more characteristics of thin film electroactive materials, including the Poisson's ratio to generate a lateral deformation (e.g., lateral expansion or contraction) as a response to compression between conductive electrodes. Example virtual reality/augmented reality assemblies containing electroactive layers may include deformable optics, such as mirrors, lenses, accommodative, or adaptive optics.

In some embodiments, the electroactive response may include a mechanical response to an electrical input that varies over the spatial extent of the device, with the electrical input being applied by a control circuit to a layer of electroactive material located between paired electrodes. The mechanical response may be termed an actuation, and example devices may be, or include, actuators. In particular embodiments, a deformable optical element and an electroactive layer may be co-integrated whereby the optical element may itself be actuatable. Deformation of an electroactive polymer or ceramic may be used to focus or tune the active optical elements in an optical assembly, such as a lens system.

In various optical systems, a quality user experience may rely on accurate and precise deformation of an electroactive element to desirably tune an associated optical element. According to some embodiments, a control system may be used to regulate the actuation of one or more electroactive elements over multiple cycles. Notwithstanding recent developments, it remains a challenge to controllably actuate a transparent optical element.

Further to the foregoing, as will be appreciated by those skilled in the art, principal sources of positioning error for many electroactive materials, particularly piezoelectric materials, include hysteresis and drift. As such, the various actuator control systems disclosed herein may contain features and elements that support low hysteresis and/or substantially drift-free operation.

In accordance with various embodiments, a transparent optical element may include a primary electrode, a secondary electrode overlapping at least a portion of the primary electrode, an electroactive layer disposed between and abutting the primary electrode and the secondary electrode, and a control system operably coupled to at least one of the primary electrode and the secondary electrode and adapted to provide a drive signal to actuate the electroactive layer within a transparent aperture.

As used herein, a material or element that is "transparent" or "optically transparent" may, for example, have a transmissivity within the visible light spectrum of at least approximately 50%, e.g., 50, 60, 70, 80, 90, 95, 97, 98, 99, or 99.5%, including ranges between any of the foregoing values, and less than approximately 80% haze, e.g., 1, 2, 5, 10, 20, 50, 60 or 70% haze, including ranges between any of the foregoing values. In accordance with some embodiments, a "fully transparent" material or element has a transmissivity (i.e., optical transmittance) within the visible light spectrum of at least approximately 80%, e.g., 80, 90, 95, 97, 98, 99, or 99.5%, including ranges between any of the foregoing values, and less than approximately 10% haze, e.g., 0, 1, 2, 4, 6, or 8% haze, including ranges between any of the foregoing values.

In some embodiments, an applied voltage may induce a reorientation of dipoles within an electroactive (e.g., piezoelectric) layer, which can be used to tune the transparency of the layer. Without wishing to be bound by theory, this effect may be accentuated at or above the coercive field for the piezoelectric material, which may be approximately equal to the magnitude of the applied electric field used for poling (i.e., dipole alignment). An optical element having such controllable transparency may be incorporated into a head-mounted display, for example.

The electroactive layer may include one or more electroactive materials. An optical element may include one or more electroactive materials, such as electroactive polymers or ceramics and may also include additional components. As used herein, "electroactive materials" may, in some examples, refer to materials that exhibit a change in size or shape when stimulated by an electric field. In some embodiments, an electroactive material may include a deformable polymer or ceramic that may be symmetric with regard to electrical charge (e.g., polydimethylsiloxane (PDMS), acrylates, etc.) or asymmetric (e.g., poled polyvinylidene fluoride (PVDF) or its copolymers such as poly(vinylidenefluoride-co-trifluoroethylene) (PVDF-TrFE)). Further PVDF-based polymers may include poly(vinylidene fluoride-trifluoroethylene-chlorofluoroethylene) (P(VDF-TrFE-CFE)) or poly(vinylidenefluoride-trifluoroethylene-chlorotrifluoroethylene (P(VDF-TrFE-CTFE)).

For piezoelectric polymers like PVDF homopolymer, the piezoelectric response may be tuned by altering the crystalline content and/or the crystalline orientation within the polymer matrix, e.g., by uniaxial or biaxial stretching, followed by poling. The origin of piezoelectricity in PVDF homopolymer is believed to be the β-phase crystallite polymorph, which is the most electrically active and polar of the PVDF phases. Alignment of the β-phase structure may be used to achieve the desired piezoelectric effect. Poling may be performed to align the β-phase and enhance the piezoelectric response. Other piezoelectric polymers, such as PVDF-TrFE and PVDF-TrFE-CFE may be suitably oriented upon formation and the piezoelectric response of such polymers may be improved by poling with or without stretching.

Additional examples of materials forming electroactive polymers may include, without limitation, styrenes, polyesters, polycarbonates, epoxies, halogenated polymers, such as PVDF, copolymers of PVDF, such as PVDF-TrFE, silicone polymers, and/or any other suitable polymer or polymer precursor materials including ethyl acetate, butyl acrylate, octyl acrylate, ethylethoxy ethyl acrylate, 2-chloroethyl vinyl ether, chloromethyl acrylate, methacrylic acid, dimethacrylate oligomers, isocyanates, allyl glycidyl ether, N-methylol acrylamide, or mixtures thereof. Example acrylates may be free-radical initiated. Such materials may have any suitable dielectric constant or relative permittivity, such as, for example, a dielectric constant ranging from approximately 2 to approximately 30.

Ceramic electroactive materials, such as single crystal piezoelectric materials, may be formed using hydrothermal processing or a Czochralski method to produce an oriented ingot, which may be cut along a specified crystal plane to produce wafers having a desired crystalline orientation. A wafer may be thinned, e.g., via lapping, or polished, and transparent electrodes may be formed directly on the wafer, e.g., using chemical vapor deposition or a physical vapor deposition process such as sputtering or evaporation. Optionally, the electroactive ceramic may be poled to achieve a desired dipole alignment.

In addition to the foregoing, polycrystalline piezoelectric materials may be formed, e.g., by powder processing. Densely-packed networks of high purity, ultrafine polycrystalline particles can be highly transparent and may be more mechanically robust in thin layers than their single crystal counterparts. For instance, optical grade PLZT having >99.9% purity may be formed using sub-micron (e.g., <2 µm) particles. In this regard, substitution via doping of $Pb^{2+}$ at A and B-site vacancies with $La^{2+}$ and/or $Ba^{2+}$ may be used to increase the transparency of perovskite ceramics such as PZN-PT, PZT and PMN-PT. Further example piezoelectric ceramic materials may include barium titanate, barium niobate, lithium niobate, titanium niobate, and the like.

According to some embodiments, ceramic piezoelectric materials may be derived from ultrafine particle precursors, which can be fabricated via wet chemical methods, such as chemical co-precipitation, sol-gel and gel combustion techniques. Green bodies may be formed using tape casting, slip casting, or gel casting. High pressure and high temperature sintering via techniques such as hot pressing, high pressure (HP) and hot isostatic pressure, spark plasma sintering, and microwave sintering, for example, may be used to improve the ceramic particle packing density. Thinning via lapping and/or polishing may be used to decrease surface roughness to achieve thin, highly optically transparent layers that are suitable for high displacement actuation.

As will be appreciated, the methods and systems shown and described herein may be used to form electroactive devices having a single layer or multiple layers of an electroactive material (e.g., a few layers to tens, hundreds, or thousands of stacked layers). For example, an electroactive device may include a stack of from two electroactive elements and corresponding paired electrodes to thousands of electroactive elements (e.g., approximately 5, approximately 10, approximately 20, approximately 30, approximately 40, approximately 50, approximately 100, approximately 200, approximately 300, approximately 400, approximately 500, approximately 600, approximately 700, approximately 800, approximately 900, approximately 1000, approximately 2000, or greater than approximately 2000 electroactive elements, including ranges between any of the foregoing values). A large number of layers may be used to achieve a high displacement output, where the overall displacement may be expressed as the sum of the displacement of each layer. Such complex arrangements can enable compression, extension, twisting, and/or bending when operating the electroactive device.

Thus, single-layer, bi-layer, and multi-layer optical element architectures are disclosed, and may optionally include pre-strained electroactive layers, e.g., elastomeric layers. By way of example, a pre-tensioned stack may be formed by a lamination process. In conjunction with such a process, a rigid frame may be used to maintain line tension within the polymeric electroactive layer(s) during lamination. Further manufacturing methods for the optical element are disclosed, including the formation of a buckled layer by thermoforming about a mold, which may be used to achieve a desired piezoelectric response while potentially obviating the need for introducing (and maintaining) layer pre-tension. Also disclosed are various augmented reality stack designs and lens geometries based on buckled layer or molded layer paradigms.

As will be explained in greater detail below, embodiments of the instant disclosure relate to control of an optical element that includes a primary electrode, a secondary electrode overlapping at least a portion of the primary electrode, and an electroactive layer disposed between and abutting the primary electrode and the secondary electrode. An optical device may include a tunable lens or other structure that includes the optical element.

In the presence of an electrostatic field (E-field), an electroactive material may deform (e.g., compress, elongate, shear, etc.) according to the magnitude and direction of the applied field. Generation of such a field may be accomplished, for example, by placing the electroactive material between two electrodes, i.e., a primary electrode and a secondary electrode, each of which is at a different potential. As the potential difference (i.e., voltage difference) between the electrodes is increased (e.g., from zero potential) the amount of deformation may also increase, principally along electric field lines. This deformation may achieve saturation when a certain electrostatic field strength has been reached. With no electrostatic field, the electroactive material may be in its relaxed state undergoing no induced deformation, or stated equivalently, no induced strain, either internal or external.

The physical origin of the compressive nature of electroactive materials in the presence of an electrostatic field (E-field), being the force created between opposite electric charges, is that of the Maxwell stress, which is expressed mathematically with the Maxwell stress tensor. The level of strain or deformation induced by a given E-field is dependent on the square of the E-field strength, and on the dielectric constant and elastic compliance of the electroactive material. Compliance in this case is the change of strain with respect to stress or, equivalently, in more practical terms, the change in displacement with respect to force. In some embodiments, an electroactive layer may be pre-strained (or pre-stressed) to modify the stiffness of the optical element and hence its actuation characteristics.

In some embodiments, an electroactive polymer may include an elastomer. As used herein, an "elastomer" may, in some examples, refer to a material having viscoelasticity (i.e., both viscosity and elasticity), relatively weak intermolecular forces, a generally low elastic modulus (a measure of the stiffness of a solid material), and a high strain-to-failure compared with other materials. In some embodiments, an electroactive polymer may include an elastomer material that has an effective Poisson's ratio of less than approximately 0.35 (e.g., less than approximately 0.3, less than approximately 0.25, less than approximately 0.2, less than approximately 0.15, less than approximately 0.1, or less than approximately 0.05). In at least one example, the elastomer material may have an effective density that is less than approximately 90% (e.g., less than approximately 80%, less than approximately 70%, less than approximately 60%, less than approximately 50%, less than approximately 40%) of the elastomer when densified (e.g., when the elastomer is compressed, for example, by electrodes to make the elastomer more dense).

In some embodiments, the term "effective density," as used herein, may refer to a parameter that may be obtained using a test method where a uniformly thick layer of an electroactive ceramic or polymer, e.g., elastomer, may be placed between two flat and rigid circular plates. In some embodiments, the diameter of the electroactive material being compressed may be at least 100 times the thickness of the electroactive material. The diameter of the electroactive layer may be measured, then the plates may be pressed together to exert a pressure of at least approximately $1 \times 10^6$ Pa on the electroactive layer, and the diameter of the layer is remeasured. The effective density may be determined from an expression ($DR = D_{uncompressed}/D_{compressed}$), where DR may represent the effective density ratio, $D_{uncompressed}$ may represent the density of the uncompressed electroactive layer, and $D_{compressed}$ may represent the density of the compressed electroactive layer.

In some embodiments, the optical elements described herein may include an elastomeric electroactive polymer having an effective Poisson's ratio of less than approximately 0.35 and an effective uncompressed density that is less than approximately 90% of the elastomer when densified. In some embodiments, the term "effective Poisson's ratio" may refer to the negative of the ratio of transverse strain (e.g., strain in a first direction) to axial strain (e.g., strain in a second direction) in a material.

In some embodiments, optical elements may include paired electrodes, which allow the creation of the electrostatic field that forces constriction of the electroactive layer. In some embodiments, an "electrode," as used herein, may refer to a conductive material, which may be in the form of a thin film or a layer. Electrodes may include relatively thin, electrically conductive metals or metal alloys and may be of a non-compliant or compliant nature.

In some embodiments, the electrodes may include a metal such as aluminum, gold, silver, tin, copper, indium, gallium, zinc, alloys thereof, and the like. An electrode may include one or more electrically conductive materials, such as a metal, a semiconductor (such as a doped semiconductor), carbon nanotubes, graphene, carbon black, transparent conductive oxides (TCOs, e.g., indium tin oxide (ITO), zinc oxide (ZnO), etc.), or other electrically conducting material.

In some embodiments, the electrodes or electrode layers may be self-healing, such that damage from local shorting of a circuit can be isolated. Suitable self-healing electrodes may include thin films of metals, such as, for example, graphene.

In some embodiments, a primary electrode may overlap (e.g., overlap in a parallel direction) at least a portion of a secondary electrode. The primary and secondary electrodes may be generally parallel and spaced apart and separated by a layer of electroactive material. A tertiary electrode may overlap at least a portion of either the primary or secondary electrode.

An optical element may include a first electroactive layer (e.g., elastomer material) which may be disposed between a first pair of electrodes (e.g., the primary electrode and the secondary electrode). A second optical element, if used, may include a second electroactive layer and may be disposed between a second pair of electrodes. In some embodiments, there may be an electrode that is common to both the first pair of electrodes and the second pair of electrodes.

In some embodiments, one or more electrodes may be optionally electrically interconnected, e.g., through a contact layer, to a common electrode. In some embodiments, an optical element may have a first common electrode, connected to a first plurality of electrodes, and a second common electrode, connected to a second plurality of electrodes. In some embodiments, selected electrodes (e.g., one of a first plurality of electrodes and one of a second plurality of electrodes) may be electrically isolated from each other using an insulator. An insulator may include a material without appreciable electrical conductivity, and may include a dielectric material, such as, for example, an acrylate or silicone polymer.

In some embodiments, a common electrode may be electrically coupled (e.g., electrically contacted at an interface having a low contact resistance) to one or more other electrode(s), e.g., a secondary electrode and a tertiary electrode located on either side of a primary electrode.

In some embodiments, electrodes may be flexible and/or resilient and may stretch, for example elastically, when an optical element undergoes deformation. In this regard, electrodes may include one or more transparent conducting oxides (TCOs) such as indium oxide, tin oxide, indium tin oxide (ITO), indium gallium zinc oxide (IGZO), and the like, graphene, carbon nanotubes, silver nanowires, etc. In some embodiments, a yield point of one or more electrodes may be greater than 0.5%. In other embodiments, relatively rigid electrodes (e.g., electrodes including a metal such as aluminum) may be used.

In some embodiments, the electrodes (e.g., the primary electrode and the secondary electrode) may have a thickness of approximately 1 nm to approximately 1000 nm, with an example thickness of approximately 10 nm to approximately 50 nm. A thickness of an electrode that includes a self-healing property (e.g., an aluminum electrode) may be approximately 20 nm. In some embodiments, a common electrode may have a sloped shape, or may be a more complex shape (e.g., patterned or freeform). In some embodiments, a common electrode may be shaped to allow compression and expansion of an optical element or device during operation.

The electrodes in certain embodiments may have an optical transmissivity of at least approximately 50%, e.g., approximately 50%, approximately 60%, approximately 70%, approximately 80%, approximately 90%, approximately 95%, approximately 97%, approximately 98%, approximately 99%, or approximately 99.5%, including ranges between any of the foregoing values.

In some embodiments, the electrodes described herein (e.g., the primary electrode, the secondary electrode, or any other electrode including any common electrode) may be fabricated using any suitable process. For example, the electrodes may be fabricated using physical vapor deposition (PVD), chemical vapor deposition (CVD), evaporation, spray-coating, spin-coating, screen printing, atomic layer deposition (ALD), and the like. In further aspects, the electrodes may be manufactured using a thermal evaporator, a sputtering system, stamping, and the like.

In some embodiments, a layer of electroactive material may be deposited directly on to an electrode. In some embodiments, an electrode may be deposited directly on to the electroactive material. In some embodiments, electrodes may be prefabricated and attached to an electroactive material. In some embodiments, an electrode may be deposited on a substrate, for example a glass substrate or flexible polymer film. In some embodiments, the electroactive material layer may directly abut an electrode. In some embodiments, there may be a dielectric layer, such as an insulating layer, between a layer of electroactive material and at least a portion of an electrode.

In some applications, an optical element used in connection with the principles disclosed herein may include a primary electrode, a secondary electrode, and an electroactive layer disposed between the primary electrode and the secondary electrode, where at least one of the primary electrode and the secondary electrode is electrically connected to a control circuit configured to apply a voltage across the electroactive layer. The electroactive layer may be capacitively actuated to deform an optical element and hence modify its mechanical and optical performance. By way of example, the optical element may be located within the transparent aperture of an optical device, e.g., a liquid lens, although the present disclosure is not particularly limited and may be applied in a broader context. By way of example, the optical element may be incorporated into an active grating, tunable lens, accommodative optical elements, or adaptive optics, and the like.

In some embodiments, there may be one or more additional electrodes, and a common electrode may be electrically coupled to one or more of the additional electrodes. For example, optical elements may be disposed in a stacked configuration, with a first common electrode coupled to a first plurality of electrodes, and a second common electrode electrically connected to a second plurality of electrodes. The first and second pluralities may alternate in a stacked configuration, so that each electroactive layer is located between one of the first plurality of electrodes and one of the second plurality of electrodes.

In some embodiments, an optical element (e.g., including primary and secondary electrodes and an intervening electroactive layer) may have a thickness of approximately 10 nm to approximately 10 μm (e.g., approximately 10 nm, approximately 20 nm, approximately 30 nm, approximately 40 nm, approximately 50 nm, approximately 60 nm, approximately 70 nm, approximately 80 nm, approximately 90 nm, approximately 100 nm, approximately 200 nm, approximately 300 nm, approximately 400 nm, approximately 500 nm, approximately 600 nm, approximately 700 nm, approximately 800 nm, approximately 900 nm, approximately 1 μm, approximately 2 μm, approximately 3 μm, approximately 4 μm, approximately 5 μm, approximately 6 μm, approximately 7 μm, approximately 8 μm, approximately 9 μm, approximately 10 μm), with an example thickness of approximately 200 nm to approximately 500 nm.

The application of a voltage between the electrodes can cause compression of the intervening electroactive layer(s) in the direction of the applied electric field and an associated expansion or contraction of the electroactive layer(s) in one or more transverse dimensions. In some embodiments, an applied voltage (e.g., to the primary electrode and/or the secondary electrode) may create at least approximately 0.1% strain (e.g., an amount of deformation in the direction of the applied force resulting from the applied voltage divided by the initial dimension of the material) in the electroactive layer(s) in at least one direction (e.g., an x, y, or z direction with respect to a defined coordinate system).

In some embodiments, the electroactive response may include a mechanical response to the electrical input that varies over the spatial extent of the device, with the electrical input being applied to one or both of the primary electrode and the secondary electrode by the driver circuit of a control system.

The optical element may be deformable from an initial state to a deformed state when a first voltage is applied between the primary electrode and the secondary electrode and may further be deformable to a second deformed state when a second voltage is applied between the primary electrode and the secondary electrode.

An electrical signal may include a potential difference, which may include a direct or alternating voltage. In some embodiments, the frequency may be higher than the highest mechanical response frequency of the device, so that deformation may occur in response to the applied RMS electric field but with no appreciable oscillatory mechanical response to the applied frequency. The applied electrical signal may generate non-uniform constriction of the electroactive layer between the primary and secondary electrodes. A non-uniform electroactive response may include a curvature of a surface of the optical element, which may in some embodiments be a compound curvature.

In some embodiments, an optical element may have a maximum thickness in an undeformed state and a compressed thickness in a deformed state. In some embodiments, an optical element may have a density in an undeformed state that is approximately 90% or less of a density of the optical element in the deformed state. In some embodiments, an optical element may exhibit a strain of at least approximately 0.1% when a voltage is applied between the primary electrode and the secondary electrode.

In some embodiments, an optical device may include one or more optical elements, and an optical element may include one or more electroactive layers. In various embodiments, an optical element may include a primary electrode, a secondary electrode overlapping at least a portion of the primary electrode, and an electroactive layer disposed between the primary electrode and the secondary electrode. An optical element may include additional electroactive layers and electrodes.

In some embodiments, the application of an electric field over an entirety of an electroactive layer may generate substantially uniform deformation between the primary and secondary electrodes. In some embodiments, the primary electrode and/or the secondary electrode may be patterned, allowing a localized electric field to be applied to a portion of the optical element, for example, to provide a localized deformation.

An optical device may include a plurality of stacked elements. For example, each element may include an electroactive layer located between a pair of electrodes. In some embodiments, an electrode may be shared between elements; for example, a device may have alternating electrodes and an electroactive layer located between neighboring pairs of electrodes. Various stacked configurations can be constructed in different geometries that alter the shape, alignment, and spacing between elements. Such complex arrangements can enable compression, extension, twisting, and/or bending when operating such an actuator.

In some embodiments, an optical device may include additional elements interleaved between electrodes, such as in a stacked configuration. For example, electrodes may form an interdigitated stack of electrodes, with alternate electrodes connected to a first common electrode and the remaining alternate electrodes connected to a second common electrode. An additional optical element may be disposed on the other side of a primary electrode. The additional optical element may overlap a first optical element. An additional electrode may be disposed abutting a surface of any additional optical element. In some embodiments, an optical device may include more (e.g., two, three, or more) such additional electroactive layers and corresponding electrodes.

In accordance with some embodiments, a control system may be used to actuate one or more electroactive layers, which may be used to operatively tune an optical element. The control system may include at least one of an open-loop circuit, a feed-forward circuit, and a closed-loop circuit, and may further include a driver circuit that is current driven, charge driven, voltage driven, or a combination of current, charge, and voltage driven. In certain embodiments, for example, hysteresis may be compensated by regulating the amount of current or charge flowing through the electroactive layer.

In accordance with some embodiments, a closed-loop circuit may include a sensing element adapted to provide operational feedback during use. The sensing element (e.g., sensor, detector, encoder, etc.) may be configured to detect a stimulus, such as physical displacement, and convert the stimulus to an electrical signal. As will be appreciated, sensing elements may provide direct or indirect measurements, and may include load cells, strain gauges, optical sensors, displacement sensors, capacitive sensors, or pressure sensors, etc.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-26, detailed descriptions of transparent actuators and control systems used to regulate such actuators. The discussion associated with FIG. 1 includes a description of a bimorph actuator connected to a control system according to various embodiments. The discussion associated with FIGS. 2-4 includes a description of example control systems operable to affect actuation of transparent optical elements. The discussion associated with FIG. 5 includes a description of the hysteresis response for example voltage and charge driven actuators. The discussion associated with FIGS. 6-12 relates to example driver circuits that may be used to actuate transparent optical elements. The discussion associated with FIGS. 13-22 includes a description of example sensor systems that may be used in conjunction with closed-loop control of various transparent optical elements. The discussion associated with FIG. 23 relates to an example control system for closed-loop actuation of a transparent optical element. The discussion associated with FIGS. 24-26 relates to exemplary virtual reality and augmented reality devices that may include a transparent optical element.

Referring to FIG. 1, an optical element 100 includes a primary electrode 114, a secondary electrode 116 overlapping at least a portion of the primary electrode 114, a tertiary electrode 118 overlapping at least a portion of the secondary electrode 114, a first electroactive layer 111 disposed between the primary electrode 114 and the secondary electrode 116, and a second electroactive layer 113 disposed between the secondary electrode 116 and the tertiary electrode 118. The primary, secondary, and tertiary electrodes of the optical element 100 may be electrically connected to a control system 120 configured to apply a voltage to one or more of the electrodes.

Figure 2:
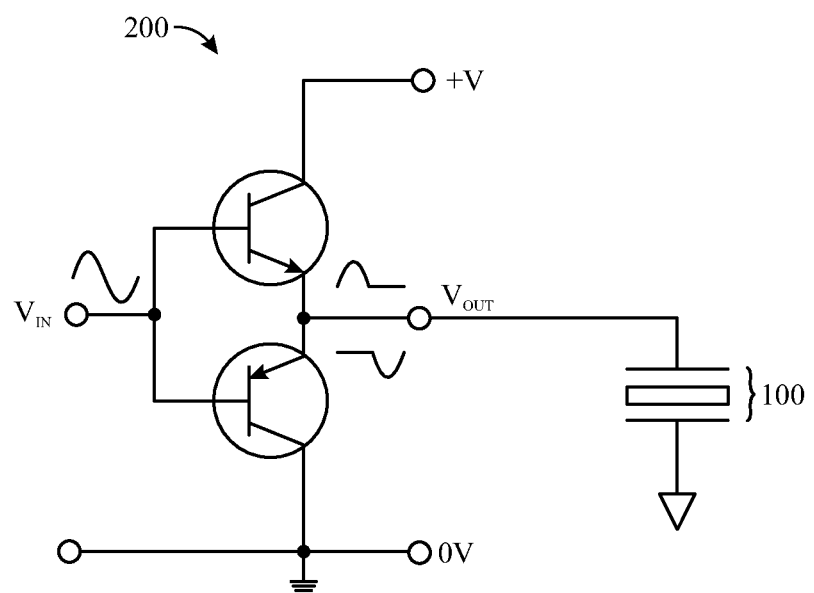
FIG. 2 shows a transparent optical element electrically connected to a Class B amplifier according to some embodiments.

In accordance with certain embodiments, the magnitude of the applied voltage(s) may be determined by the desired displacement in conjunction with one or more characteristics of the optical element. For the relatively large deflections associated with liquid lens actuation, for instance, voltages on the order of 100 V or more may be used. As such, example control systems may include at least one amplifier. According to some embodiments, the features of the control system for a transparent optical element may be selected as a function of various properties associated with the electroactive layer(s). For instance, for smaller capacitance loads, which may be associated with thicker electroactive layers, a charge transfer drive with series inductors and switched mode supply may be utilized. Such a configuration may be used for charge recovery and may also provide substantially shock-free operation. For larger capacitance loads, on the other hand, a push-pull architecture using a Class B amplifier or, for greater efficiency, a Class G/H amplifier may be incorporated into the control system. An example control system architecture 200 using a Class B amplifier connected to a transparent optical element 100 is shown in FIG. 2, while a Class G/H-based control system 300 connected to a transparent optical element 100 is shown in FIG. 3. Referring also to FIG. 4, for applications where a greater current is desired, a control system 400 including a Class B or Class G/H amplifier can be integrated to the output of an op-amp and connected to a transparent optical element 100.

Figure 5:
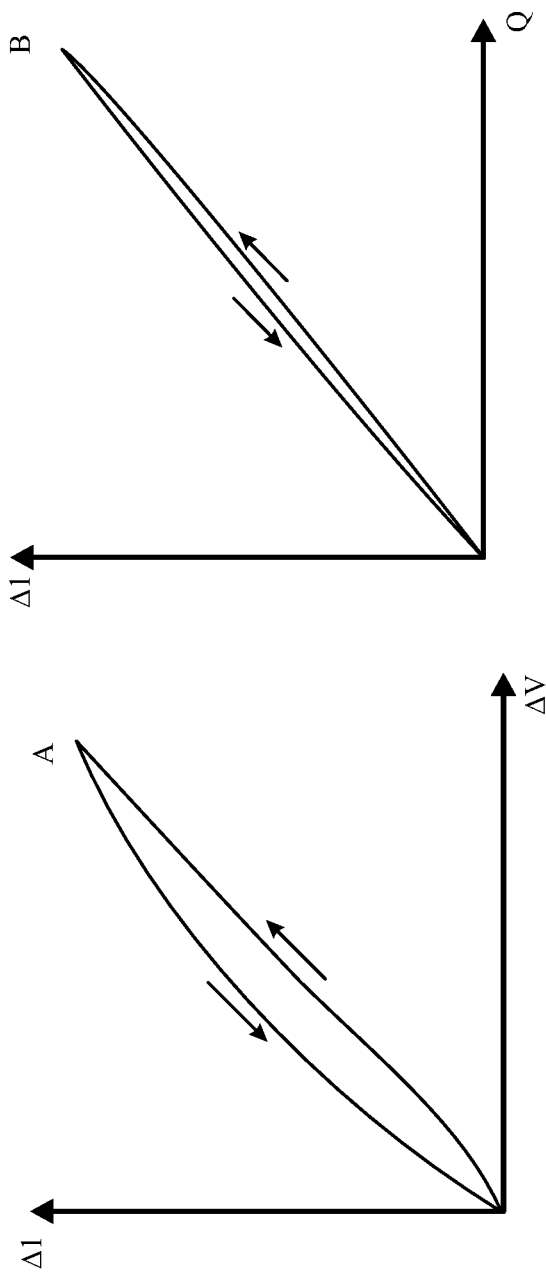
FIG. 5 is a graph of (A) displacement versus voltage and (B) displacement versus charge for voltage and charge controlled driver circuits, respectively, according to some embodiments.

As will be appreciated, transparent optical elements having a layer of piezoelectric material may be actuated by the converse piezoelectric effect, where an applied electric field (voltage) induces a mechanical stress in the crystal lattice and an attendant deformation. However, in many systems, the realignment of dipoles during deformation may be subject to dielectric hysteresis, which introduces non-linearity and lag in the relationship between displacement and applied voltage. On the other hand, the implementation of current or charge control drive schemes have been shown to reduce hysteresis by up to 90%. FIG. 5 shows representative plots of piezoelectric displacement as a function of (A) voltage and (B) charge during a loop cycle. Charge control has been shown to extend the usable range of electrostatic actuators beyond limits typically imposed by the electromechanical pull-in instability of voltage control, which may be used to produce electromechanically stable operation over a wide power range.

Given the relative linearity and comparatively low hysteresis of charge (or current) drive schemes, according to some embodiments, open loop or feedforward control paradigms may be implemented at low and high frequencies. In certain embodiments, open loop or feedforward charge (or current) drive schemes can also be integrated with additional feedback, such as resistive feedback or grounded loading to compensate for drift. Notwithstanding the foregoing, these approaches may be susceptible to unwanted drift, and therefore may be more suitable in applications where the actuator position is not intended to be maintained invariant for extended periods of time. According to further embodiments, a transparent optical element may be operated with a closed-loop control system, optionally with an integrated servomechanism and PI controller.

Figure 6:
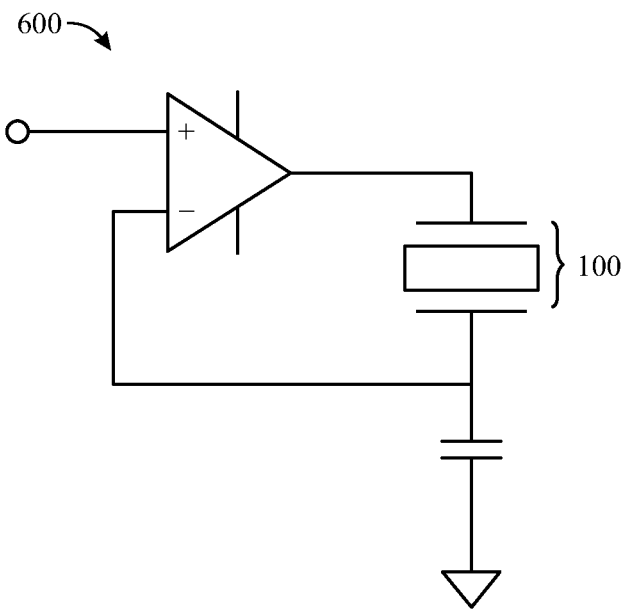
FIG. 6 depicts a charge amplifier circuit connected to a transparent optical element according to certain embodiments.
Figure 7:
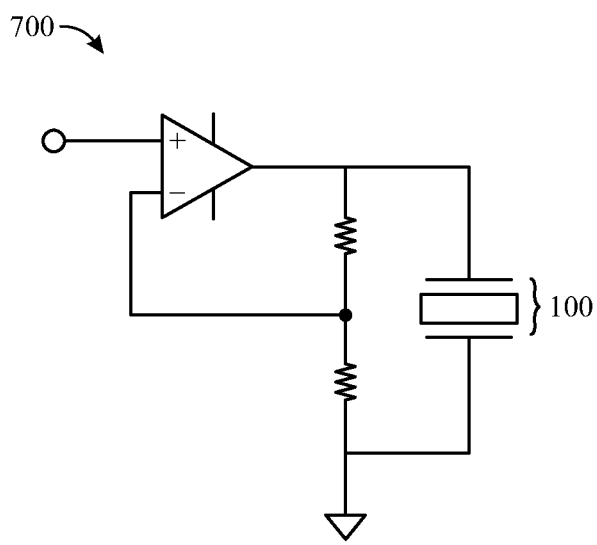
FIG. 7 depicts a voltage amplifier circuit connected to a transparent optical element according to certain embodiments.
Figure 8:
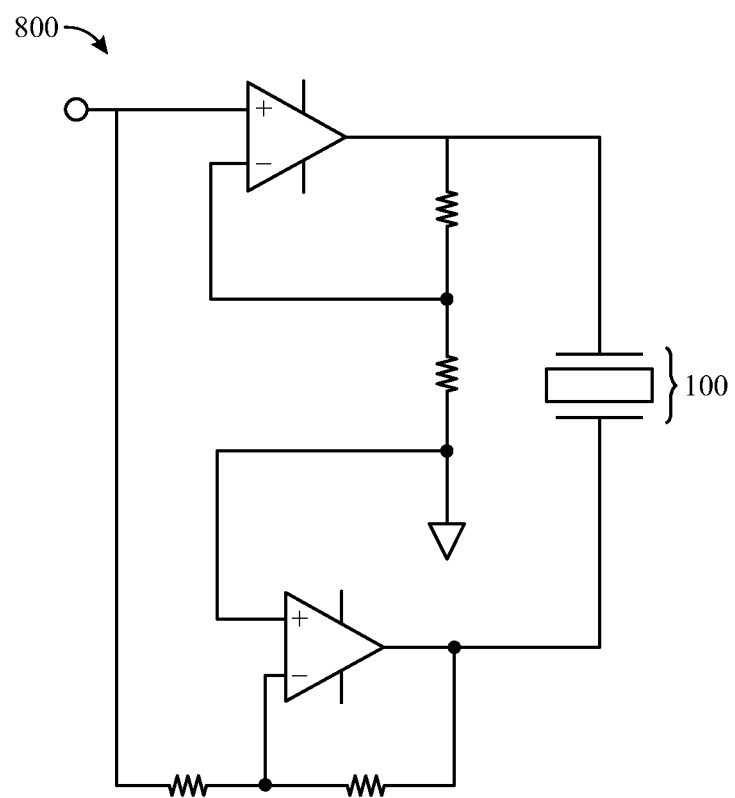
FIG. 8 depicts a voltage amplifier circuit having a bridge configuration connected to a transparent optical element according to certain embodiments.
Figure 9:
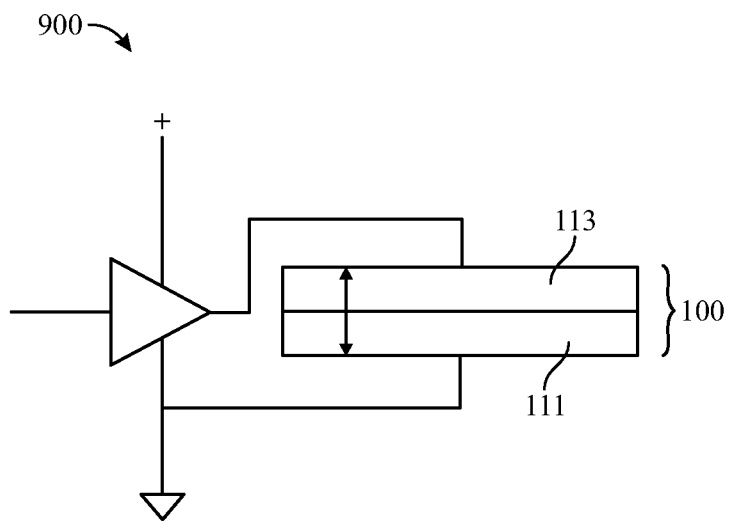
FIG. 9 shows a transparent bimorph actuator coupled to a series driver circuit according to some embodiments.
Figure 10:
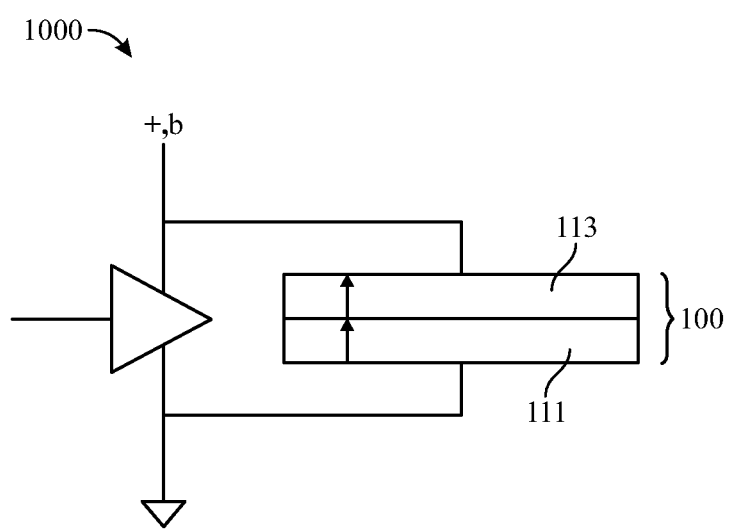
FIG. 10 shows a transparent bimorph actuator coupled to a parallel or biased unipolar driver circuit according to some embodiments.
Figure 11:
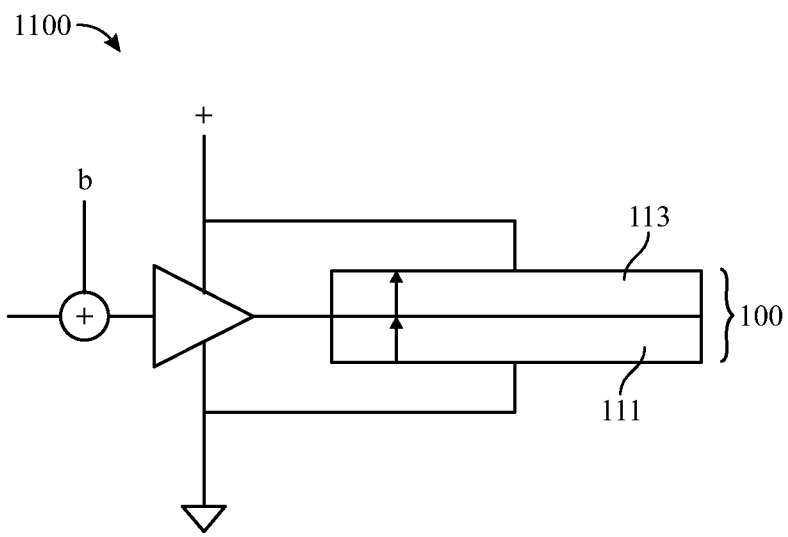
FIG. 11 shows a transparent bimorph actuator coupled to a biased bipolar driver circuit according to some embodiments.

Example amplification circuits suitable for driving a transparent optical element are shown in FIGS. 6-8. FIG. 6 shows a charge control amplifier circuit 600 for a transparent optical element 100 according to some embodiments. As will be understood by those skilled in the art, with such a control circuit, charge transfer may be improved by properly matching the reference capacitance of the circuit to the capacitance of the piezoelectric layer. According to further embodiments, shown in FIGS. 7 and 8 are example voltage amplification circuits 700, 800, respectively. The integration of the bridge configuration to the circuit 800 of FIG. 8 may be used to effectively double the output voltage.

Although op-amps are illustrated as the amplifier in FIGS. 6-8, any suitable amplifier may be used, including a Class B amplifier (for example, as shown in FIG. 2), a Class G/H (for example, as shown in FIG. 3), or an op-amp integrated with a Class B amplifier (for example, as shown in FIG. 4), etc.

Figure 12:
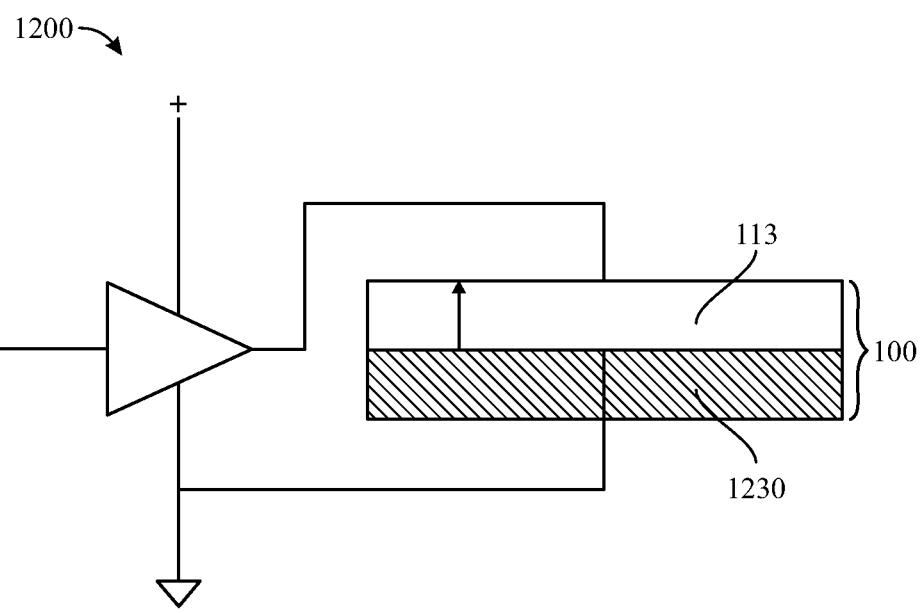
FIG. 12 shows a transparent unimorph actuator coupled to a unipolar driver circuit according to some embodiments.

According to further embodiments, a drive scheme architecture may be dependent also on poling conditions as well as the overall device structure, e.g., unimorph, bimorph, or multi-layer. For instance, series, parallel (or biased unipolar), and biased bimorph electrical drive schemes are illustrated schematically in FIGS. 9-11, respectively, where the arrows indicate the associated poling directions within the electroactive layer(s) 111, 112. In FIG. 12, shown is a unipolar drive scheme for a unimorph actuator where the electroactive layer 112 is disposed over a transparent substrate 1230, such as a glass substrate. In FIGS. 9-12, the individual electrode layers are omitted for clarity.

In accordance with various embodiments, example transparent optical elements based on a deformable membrane architecture and including an actuatable layer of electroactive material are shown in FIGS. 13-22. In some examples, the optical element may include an adjustable lens. An "adjustable lens" may include any suitable type of lens with variable and controllable optical properties (e.g., adjustable optical power/focal length, correctability for wavefront distortion and/or aberrations, etc.). In some examples, an adjustable lens may include a liquid lens.

In certain embodiments, a transparent optical element connected to a control system may be integrated with one or more sensors adapted to provide closed-loop control. Example sensors may be configured to measure force and/or displacement and may be located within the transparent aperture of an optical element or edge mounted, i.e., outside of the aperture. According to some embodiments, a device may include one or more sensors that are located within the transparent aperture and one or more sensors located outside of the transparent aperture. Example devices that include a transparent optical element and an edge mounted sensing element are shown in FIGS. 13-19.

Figure 13:
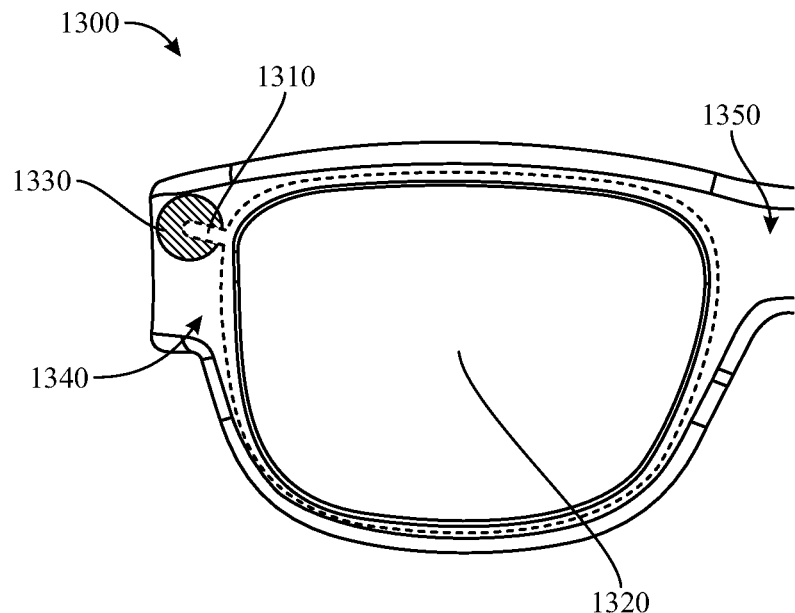
FIG. 13 is a schematic illustration showing a transparent optical element integrated with a temple arm-mounted force sensor according to certain embodiments.

Referring to FIG. 13, a rigid tab 1310 affixed to an edge of a liquid lens 1320 may be integrated with a force sensor 1330, which can be mounted along or proximate a temple arm 1340, as illustrated, and/or along the nose bridge 1350 of the device 1300. In certain embodiments, an electroded layer of electroactive material may be disposed over either or both surfaces of the liquid lens 1320.

Figure 14:
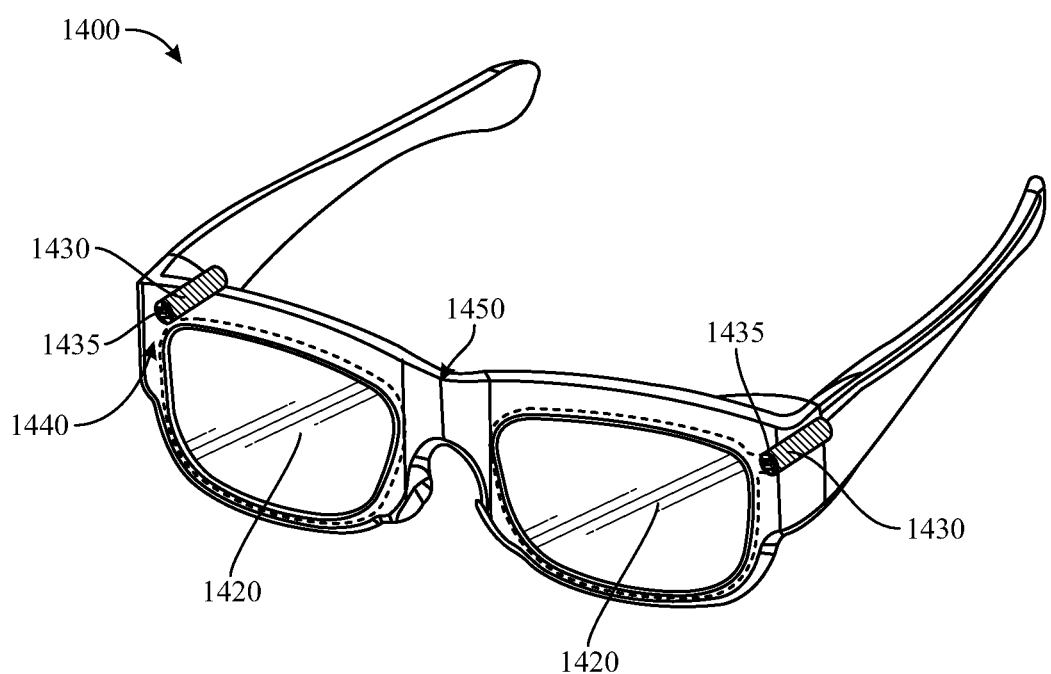
FIG. 14 is a schematic illustration showing a transparent optical element integrated with a temple arm-mounted displacement sensor according to certain embodiments.

Referring to FIG. 14, device 1400 includes a pair of liquid lenses 1420 and a corresponding pair of displacement sensors 1430 mounted to respective temple arms 1440. An element 1435, such as a protruding tab, may be used to provide a mechanical interface between each lens 1420 and each respective displacement sensor 1430. In some embodiments, in lieu of, or in addition to, temple arm-mounted sensors 1430, one or more sensors may be mounted on or proximate to the nose bridge 1450.

Figure 15:
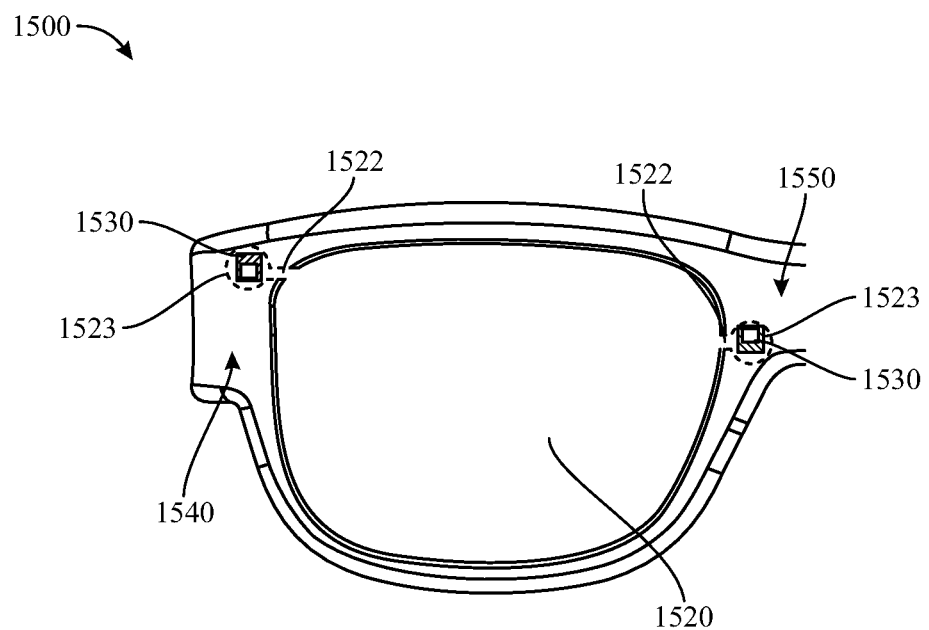
FIG. 15 is a schematic illustration showing a transparent optical element having temple arm and nose bridge-mounted pressure sensors according to certain embodiments.
Figure 16:
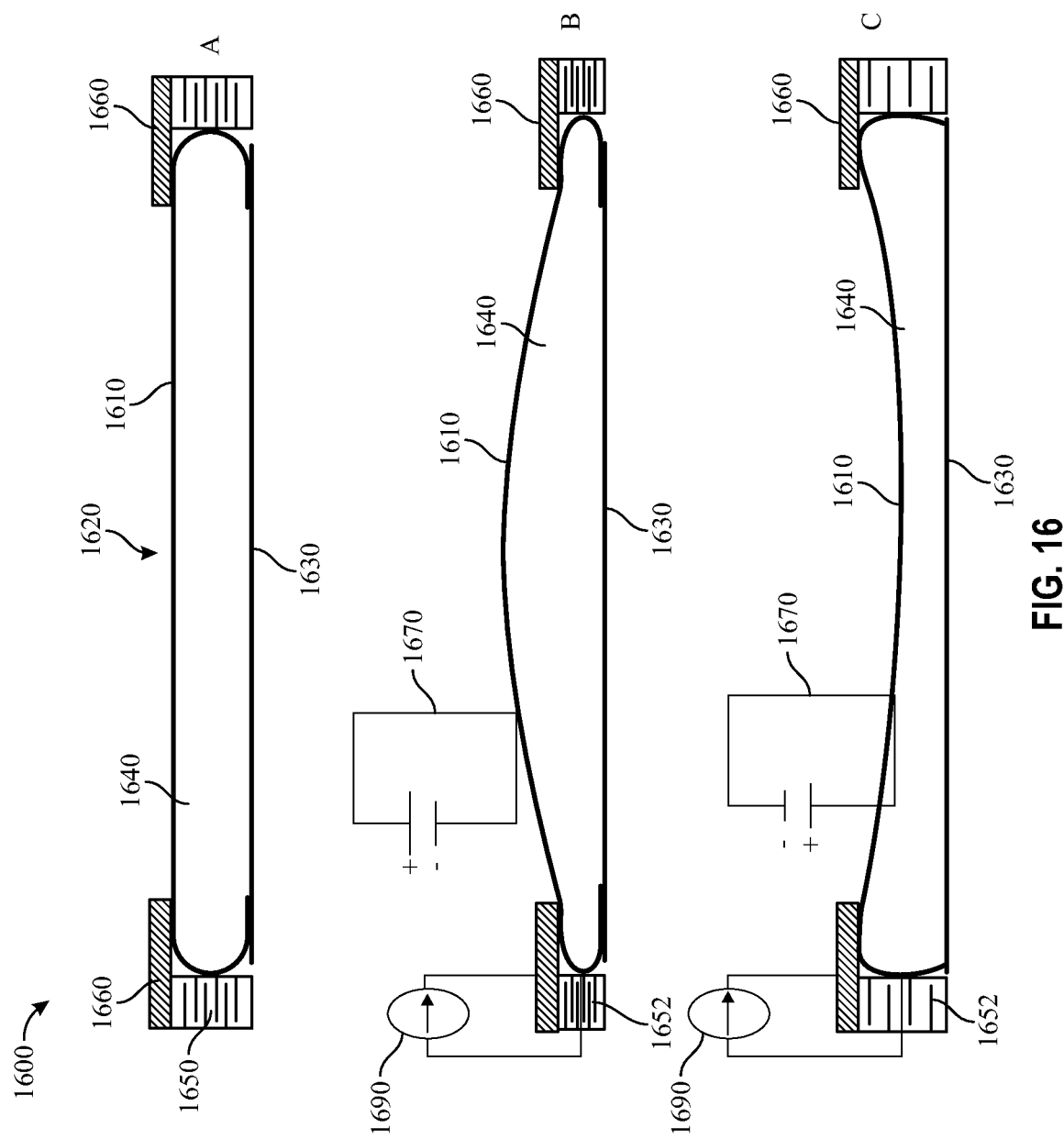
FIG. 16 shows (A) a cross-sectional diagram of a transparent liquid lens proximate to an edge-mounted sensing element, (B) the actuated liquid lens showing compression of the sensing element, and (C) the actuated liquid lens showing expansion of the sensing element according to some embodiments.

According to further embodiments, FIG. 15 shows a device 1500 including a liquid lens 1520 defining an optical aperture. Proximate to the liquid lens 1520, a pair of micro-channels 1522 may be in fluid communication with nose bridge and temple arm-mounted fluid chambers 1523 that are each interfaced with a sensor 1530. Example sensors 1530 may include micro-load cells for force sensing, MEMS pressure sensors for pressure sensing, and/or non-contact linear variable difference transformer sensors for displacement sensing. As will be appreciated, such sensing elements may be used to calculate lens curvature from a force or pressure measurement, which can be used to determine optical power and provide feedback for tuning the lens 1520.

With reference to FIG. 16A, in accordance with some embodiments of the disclosure, shown is a cross-sectional view of an example liquid lens assembly 1600 in an unactuated state including one or more layers of electroded electroactive material 1610 disposed over a surface of liquid lens 1620. Due to their transparency, the electroactive layer(s) and corresponding electrode layers (collectively 1610) may be disposed directly over a surface of the lens 1620. Such an adjustable-focus lens may further include a substrate 1630 and an optical medium 1640 that is at least partially encapsulated by the electroded electroactive layer(s) 1610 and the substrate 1630. For example, an adjustable-focus lens may include a liquid or a semi-solid material (e.g., a gas, gel, foam, or a semi-solid polymer, etc.). In general, an adjustable-focus lens may contain a substantially transparent material that deforms and/or flows under pressure.

In some embodiments, lens assembly 1600 may additionally include sensing elements 1650 located proximate to the electroded electroactive layer(s) and outside of the transparent aperture. Sensing elements 1650 may be connected to the lens 1620 via coupling elements 1660. In some embodiments, sensing elements may be located continuously or discontinuously along the periphery of an optical element. Suitable electroactive sensors may include, for example, a layer of electroactive material disposed between conductive electrodes, or a multilayer stack of alternating electroactive material and electrodes as shown schematically in FIG. 16A and FIG. 16B. The sensing electroactive material may include a ceramic or polymer composition, such as a nanovoided polymer.

Referring to FIG. 16B and FIG. 16C, a voltage may be applied to the electroactive layer(s) overlying liquid lens 1620 via driver circuit 1670. That is, the electroactive layer(s) may be actuated by the application of a voltage between respective primary and secondary electrode pairs. Actuation and the attendant deformation of the electroactive layer(s) may be used to deform the liquid lens 1620. FIG. 16B depicts the lens display assembly 1600 in an actuated state having a convex lens surface, while FIG. 16C depicts the lens display assembly 1600 in an actuated state having a concave lens surface. In some embodiments, a surface of the lens may be driven to a positive, zero, or negative curvature via the application of a suitable voltage. In some embodiments, the lens display assembly 1600 may have a positive, zero, or negative curvature in an unbiased state.

Deformation of the lens 1620 may expand or compress sensing element 1650 to form a compressed sensing element 1652 and, for example, generate a change in electrostatic capacitance that can be read as a current, charge, or voltage signal through sensing circuit 1690, which can provide feedback control.

Figure 17:
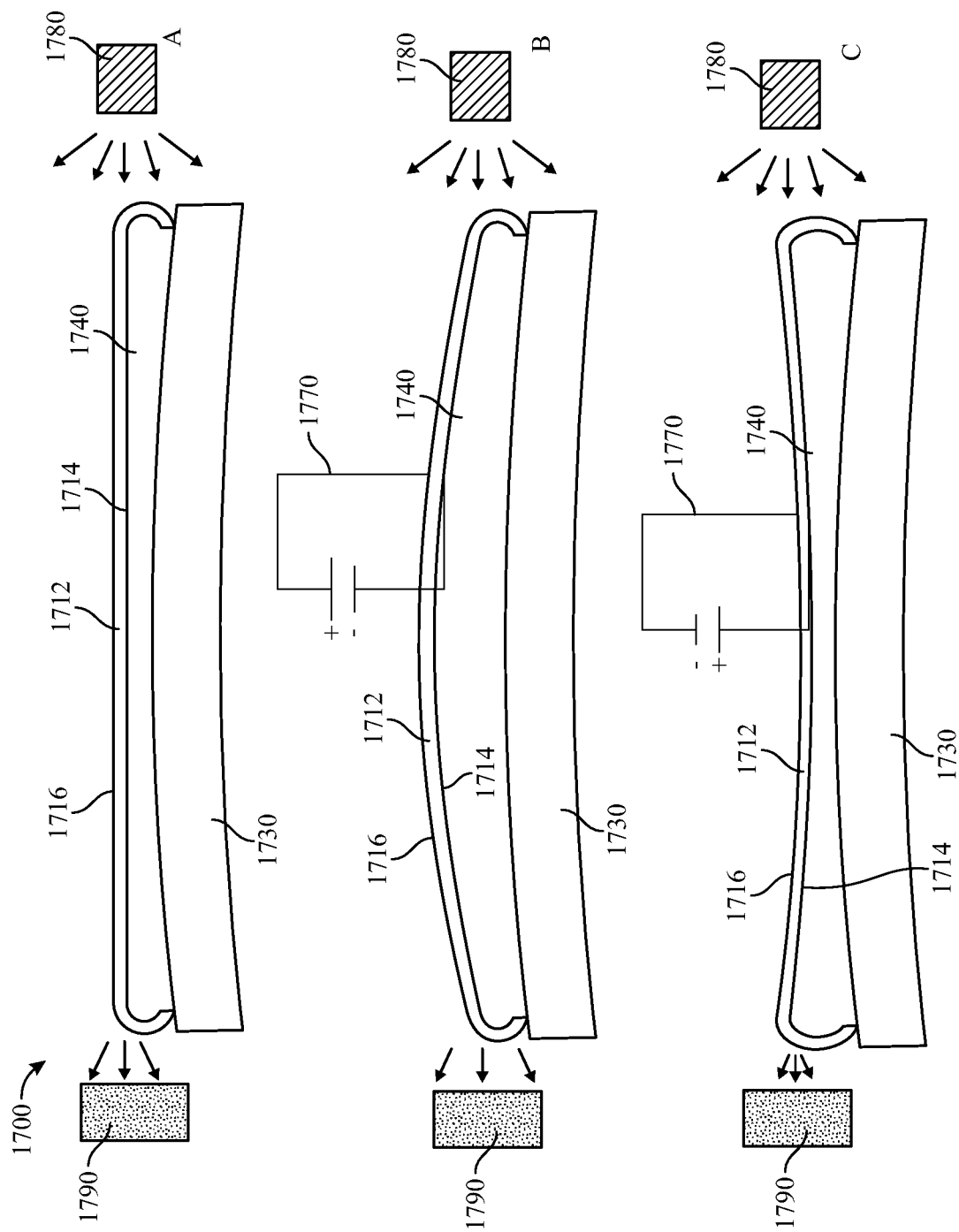
FIG. 17 shows (A) a cross-sectional diagram of a lens structure proximate to an optical sensing element, (B) the actuated lens structure with the degree of positive lens curvature measurable through the detection of incoherent light by the optical sensing element, and (C) the actuated lens structure with the degree of negative lens curvature measurable through the detection of incoherent light, according to some embodiments.
Figure 18:
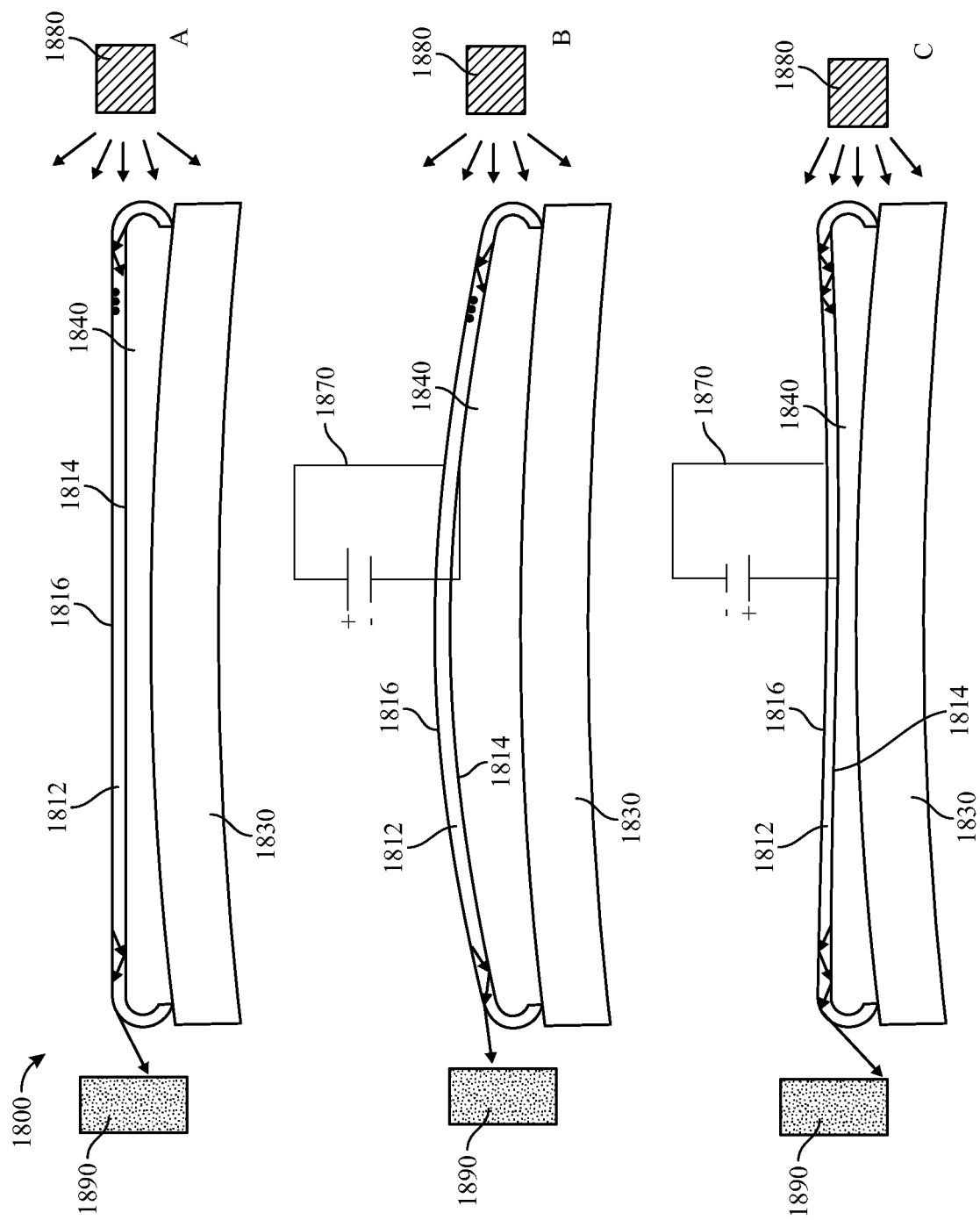
FIG. 18 shows (A) a cross-sectional diagram of a lens structure proximate to an optical sensing element, (B) the actuated lens structure with the degree of positive lens curvature measurable through the detection of coherent light by the optical sensing element, and (C) the actuated lens structure with the degree of negative lens curvature measurable through the detection of coherent light, according to some embodiments.
Figure 19:
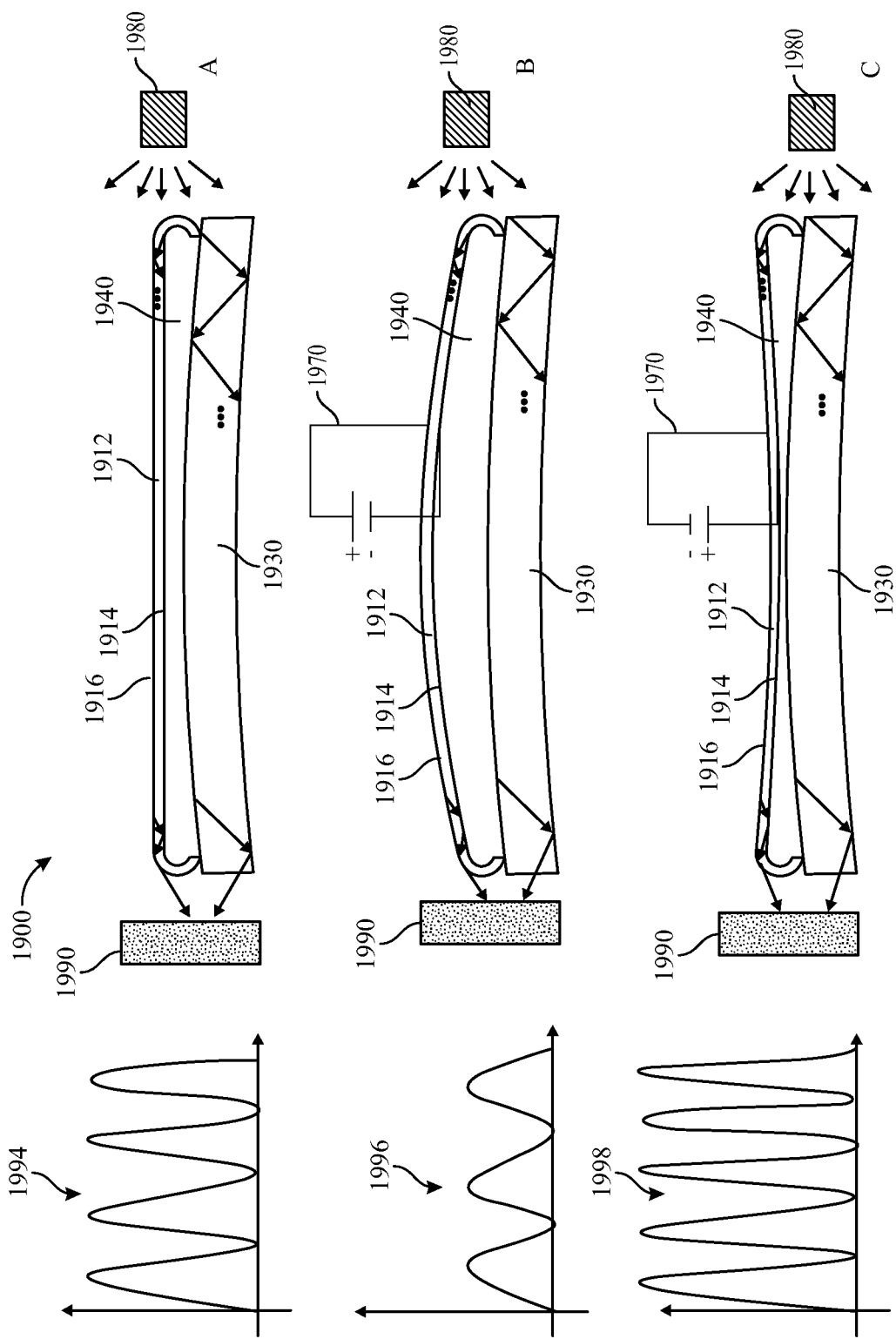
FIG. 19 shows (A) a cross-sectional diagram of a lens structure proximate to an optical sensing element, (B) the actuated lens structure with the degree of positive lens curvature measurable through the detection of coherent light by the optical sensing element, and (C) the actuated lens structure with the degree of negative lens curvature measurable through the detection of coherent light, according to further embodiments.

According to further embodiments, a sensing element may include one or more optical sources and one or more optical sensors that may be positioned proximate to a transparent optical element. Referring to FIGS. 17-19, depicted are example lens assemblies that include light source(s) and light detector(s) mounted on opposing edges of a liquid lens.

In FIG. 17A, a transparent optical element 1700 may include an electroactive layer 1712 disposed between a primary (i.e., lower) electrode 1714 and a secondary (e.g., upper) electrode 1716. The transparent optical element may further include a substrate 1730 and an optical medium 1740 disposed between the electroded electroactive layer and the substrate 1730.

A sensing element located adjacent to the transparent optical element 1700 may include a light source 1780 and a light detector 1790. In certain embodiments, the light source may be configured to emit incoherent light. An example light source 1780 may include a light emitting diode (LED) and, in certain embodiments, the light detector 1790 may include a photodiode. Referring to FIG. 17B and FIG. 17C, a driver circuit 1770 may be used to actuate the transparent optical element 1700. In some embodiments, with actuation and the attendant deformation, a change in the curvature of the lens 1700 may affect the transmission and scattering of light emanating from the source 1980, resulting in a change in intensity measured at the detector 1790.

FIG. 17B depicts the transparent optical element 1700 in an actuated state having a convex lens surface, while FIG. 17C depicts the lens display assembly 1700 in an actuated state having a concave lens surface. In some embodiments, a surface of the lens may be driven to a positive, zero, or negative curvature via the application of a suitable voltage. In some embodiments, a surface of the lens 1700 may have a positive, zero, or negative curvature in an unbiased state.

According to further embodiments, and with reference to FIG. 18A, a transparent optical element 1800 may include an electroactive layer 1812 disposed between a primary electrode 1814 and a secondary electrode 1816. The transparent optical element may further include a substrate 1830 and an optical medium 1840 disposed between the electroded electroactive layer and the substrate 1830.

A sensing element may be located adjacent to the transparent optical element 1800 and may include a light source 1880 and a light detector 1890. In certain embodiments, the light source 1880 may be configured to emit coherent light. An example light source 1880 may include a laser diode. An example light detector 1890 may include a photodiode. Referring to FIG. 18B and FIG. 18C, a driver circuit 1870 may be used to actuate the transparent optical element 1800. FIG. 18B depicts the transparent optical element 1800 in an actuated state having a convex lens surface, while FIG. 18C depicts the lens display assembly 1800 in an actuated state having a concave lens surface. Further to the actuation and corresponding deformation of the lens 1800, a change in curvature may change the path of the light internally reflected within the electroactive layer 1812, which may be measured as a change in optical path length at the detector 1890.

Referring to FIG. 19A, according to further embodiments, a transparent optical element 1900 may include an electroactive layer 1912 disposed between a primary electrode 1914 and a secondary electrode 1916. The transparent optical element may further include a substrate 1930 and an optical medium 1940 disposed between the electroded electroactive layer and the substrate 1930.

A sensing element may be located adjacent to the transparent optical element 1900 and may include a light source 1980 and a light detector 1990. In certain embodiments, the light source 1980 may be configured to emit coherent light. An example light source 1980 may include a laser diode. An example light detector 1990 may include a photodiode.

According to some embodiments, the interaction of internally reflected coherent light within the electroactive layer 1912 and within the substrate 1930 may produce an interference pattern 1994 at detector 1990. Referring to FIG. 19B and FIG. 19C, a driver circuit 1970 may be used to actuate the transparent optical element 1900. FIG. 19B depicts the transparent optical element 1900 in an actuated state having a convex lens surface, while FIG. 19C depicts the lens display assembly 1900 in an actuated state having a concave lens surface. With a change in curvature in the electroactive layer 1912, the internal reflection condition and optical path length within the electroactive layer 1912 may be altered relative to an unactuated state, resulting in a change in intensity and periodicity of the measured interference 1996, 1998.

According to some embodiments, a sensing element may be configured to emit and detect visible light. According to some embodiments, a sensing element may be configured to emit and detect radiation outside of the visible spectrum, including infrared radiation. In some embodiments, a light source (such as light sources 1780, 1880, 1980) may emit radiation having a wavelength of approximately 390 nm to approximately 1625 nm, e.g., approximately 390, approximately 700, approximately 1000, approximately 1250, or approximately 1625 nm, including ranges between any of the foregoing values.

Figure 20:
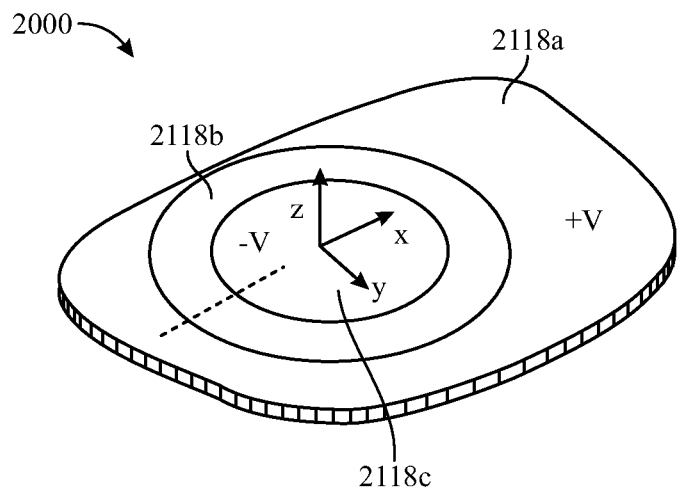
FIG. 20 depicts a transparent optical element having patterned electrodes located within the optical aperture according to some embodiments.
Figure 21:
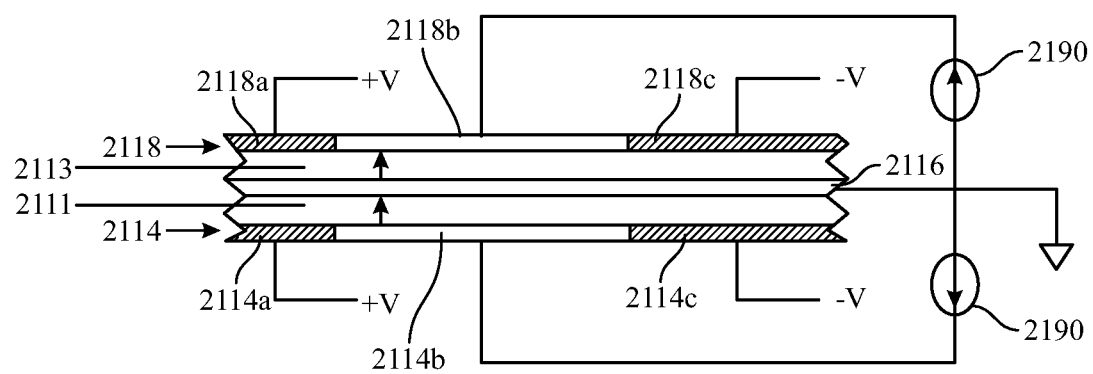
FIG. 21 is a cross-sectional image of the optical element of FIG. 20 showing the electrical connections for a parallel unipolar driver circuit according to some embodiments.
Figure 22:
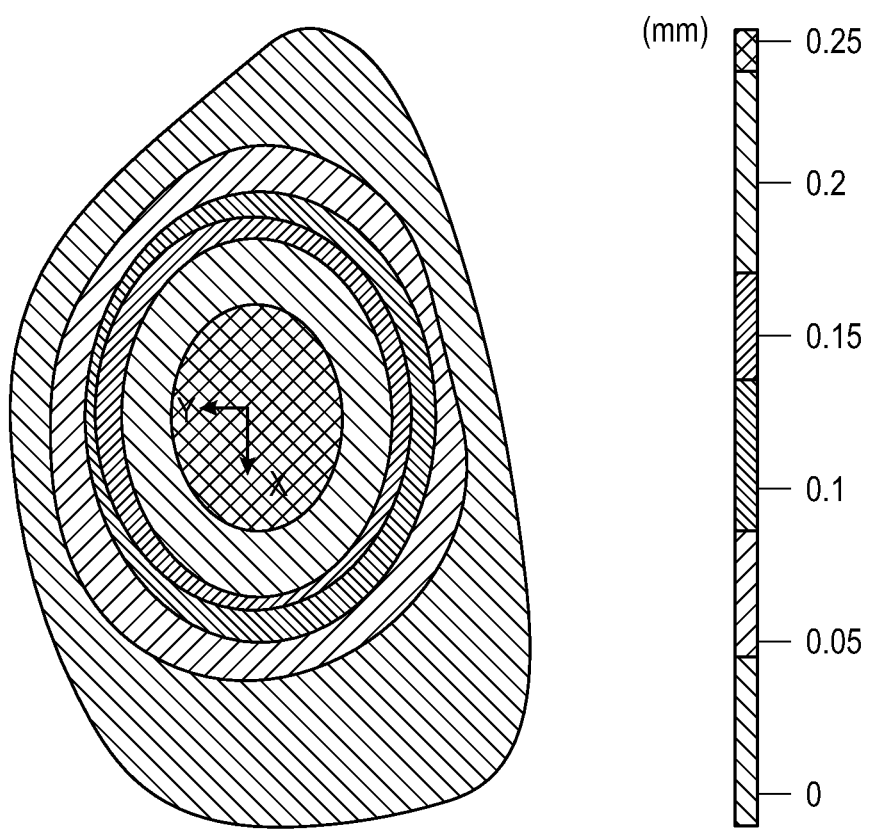
FIG. 22 shows the simulated deflection profile for the optical element of FIG. 20 according to certain embodiments.

An example device structure that includes a transparent optical element and a sensing element located within the transparent aperture is shown in FIGS. 20-22. According to some embodiments, sensors such as transparent strain gauges, etc., may be located in-field, i.e., within an optical aperture, to achieve a compact form factor. Applicants have shown that locating a transparent optical element within the aperture of an optical device can be used to tailor the deformation response of a transparent optical element, which may be used to account for inter-pupillary distance, achieve a maximize displacement, and/or realize a deflection profile for higher optical quality by reducing astigmatism and other aberrations, for example.

In embodiments where the active electrode covers less than the entire area of the aperture, regions not used for actuation may be used for sensing. In some embodiments, the passive region of the electroactive material may undergo a change in stress from the bending deformation induced via the voltage excitation of the adjacent electrodes. In embodiments where the electroactive material is a piezoelectric material, the applied stress may result in a change in polarization density that can be measured as a potential or as charge (or current) across the piezoelectric layer via the direct piezoelectric effect. For other types of electroactive materials, the bending deformation can be used to generate a measurable change in capacitance or resistance. In either case, the passive electroactive region may function as an in-field stress or strain sensor.

In this vein, a patterned in-field electrode is shown schematically in FIG. 20 and FIG. 21, where a bimorph optical element 2000 includes a primary electrode 2114, a secondary electrode 2116 overlapping at least a portion of the primary electrode 2114, a tertiary electrode 2118 overlapping at least a portion of the secondary electrode 2116, a first electroactive layer 2111 disposed between the primary electrode 2114 and the secondary electrode 2116, and a second electroactive layer 2113 disposed between the secondary electrode 2116 and the tertiary electrode 2118.

Primary electrode 2114 includes a peripheral portion 2114a, an annular portion 2114b, and a central portion 2114c. Correspondingly, tertiary electrode 2118 includes a peripheral portion 2118a, an annular portion 2118b, and a central portion 2118c. The secondary electrode 2116 may be un-patterned and disposed between the first electroactive layer 2111 and the second electroactive layer 2113.

In the illustrated embodiment, peripheral electrode portions 2114a, 2118a may be positively biased (+V) by the driver circuit of a control system (not shown) whereas central portions 2114c, 2118c may be negatively biased (−V) by the driver circuit. Annular portions of the electrodes 2114b, 2118b may be isolated from the driver circuit defining a passive electroactive region, which may be used for sensing. That is, actuation of the electroactive layers 2111, 2113 and the attendant deformation of the lens 2000 may generate a change in electrostatic capacitance that can be read as a current, charge, or voltage signal through sensing circuits 2190, which can provide feedback control. In the illustrated embodiment, an axisymmetric electrode pattern may be used to induce a nearly axisymmetric deformation, where positively (+V) and negatively (−V) biased portions of the primary and tertiary electrodes are respectively annotated.

According to some embodiments, patterned electrodes may be used to select the area of an aperture over which variable tip/tilt and curvature is effective, and accordingly selectively actuate the electrodes resulting in decoupled tip/tilt and curvature adjustment. In some embodiments, such as in device applications where tip/tilt adjustment may be applied over a larger aperture area, edge mounted actuators can be used for tip/tilt adjustment or to augment electrically controllable tip/tilt or curvature change induced by the electroactive-containing optical element within the full or partially transparent aperture.

Figure 23:
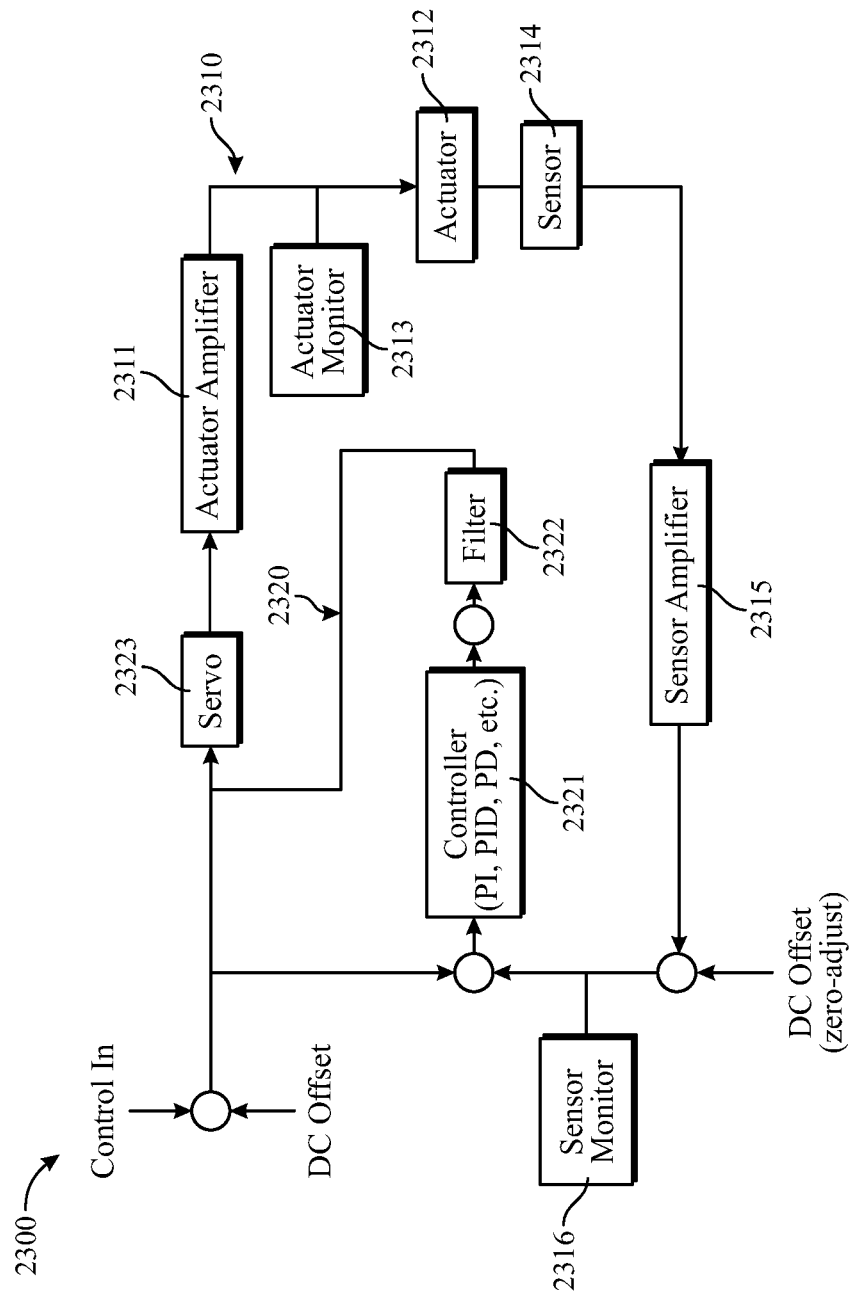
FIG. 23 depicts an example closed loop control system for a transparent optical element according to some embodiments.

In certain embodiments, a closed-loop control system may include the integration of driver and sensing circuits coupled with a control loop. A generalized schematic of a closed-loop system for controlling a transparent optical element is shown in FIG. 23. The example control system 2300 may include (a) a driver circuit 2310, including a voltage or power amplifier 2311 depending on whether the system is voltage, charge, or a combination of voltage and charge driven, an actuator 2312, an actuator monitor 2313, a sensor 2314, a sensor amplifier 2315 that may include range, bandwidth and/or gain adjustment and a sensor monitor 2316, and (b) a feedback loop 2320 that may include a controller 2321, a filter 2322, and/or a servo-mechanism 2323. According to some embodiments, a voltage or power amplifier may include a switching amplifier adapted to provide a modulated control signal via pulse width modulation (PWM). In certain embodiments, a drive signal may include multiple frequencies, such as shaped pulse or square wave, etc. Controller 2321 may utilize a proportional (P) control algorithm, a proportional-integral (PI) control algorithm, a proportional-derivative (PD) control algorithm, or a proportional-integral-derivative (PID) control algorithm, for example.

As disclosed herein, a control system for a transparent tunable actuator may be open-loop, feed-forward, or closed-loop. The actuator may include a transparent layer of electroactive material disposed between transparent electrodes. The electroactive layer may be voltage driven, charge drive and/or current driven. In some embodiments, the driver circuit may be arranged in series, parallel, unipolar, biased unipolar, biased bi-polar or dual bipolar configurations. For instance, the drive signal may be supplied via a voltage and/or power amplifier, where a power amplifier may be a switching amplifier having a modulated control signal applied via pulsed width modulation (PWM). In some embodiments, sesquipolar driving (i.e., essentially unipolar driving with a negative bias) may be used. In certain embodiments, the drive signal may contain multiple frequencies such as a shaped pulse, square wave, etc. The control system may be configured to provide low hysteresis and low drift operation of the actuator, which may be incorporated, for example, into a transparent aperture of an optical device such as a head mounted display (HMD). In addition to the foregoing, the actuator may include one or more edge-mounted or in-field sensing elements, which may enable the actuator to be used both as a sensor and an actuator.

Example Embodiments

Example 1: A transparent optical element includes a primary electrode, a secondary electrode overlapping at least a portion of the primary electrode, an electroactive layer disposed between and abutting the primary electrode and the secondary electrode, and a control system operably coupled to at least one of the primary electrode and the secondary electrode and adapted to provide a drive signal to actuate the electroactive layer within an aperture of the transparent optical element.

Example 2: The transparent optical element of Example 1, wherein the transparent electroactive layer includes a material selected from a dielectric elastomer, a piezoelectric polymer, an electrostrictive polymer, a piezoelectric ceramic, an electrostrictive ceramic, a piezoelectric single crystal, and an electrostrictive single crystal.

Example 3: The transparent optical element of any of Examples 1 and 2, wherein the control system includes at least one of an open-loop circuit, a feed-forward circuit, or a closed-loop circuit.

Example 4: The transparent optical element of any of Examples 1-3, wherein the control system comprises a driver circuit, and the driver circuit is current driven, charge driven, voltage driven, or a combination of current, charge, and voltage driven.

Example 5: The transparent optical element of Example 4, wherein the driver circuit includes a series driver circuit, a parallel driver circuit, a unipolar driver circuit, or a bipolar driver circuit.

Example 6: The transparent optical element of Example 4, further including a voltage amplifier or a power amplifier configured to provide the drive signal to the driver circuit.

Example 7: The transparent optical element of Example 6, wherein the power amplifier includes a switching amplifier.

Example 8: The transparent optical element of Example 6, wherein the drive signal includes multiple frequencies.

Example 9: The transparent optical element of any of Examples 1-8, further including a sensing element located within the aperture.

Example 10: The transparent optical element of Example 9, wherein the sensing element includes an in-field illumination source.

Example 11: The transparent optical element of any of Examples 1-10, wherein the electroactive layer has a transmissivity of at least approximately 75% and less than approximately 10% haze.

Example 12: The transparent optical element of any of Examples 1-11, wherein the primary electrode includes a plurality of independently-addressable electrodes, a first portion of the independently-addressable electrodes electrically connected to a driver circuit and a second portion of the independently-addressable electrodes electrically connected to a sensing circuit.

Example 13: The transparent optical element of any of Examples 1-12, further including a sensing element located outside the aperture.

Example 14: The transparent optical element of Example 13, wherein the sensing element is electrically connected to a control circuit including a P control loop, a P-I control loop, a P-D control loop, or a P-I-D control loop.

Example 15: A head-mounted display including the transparent optical element of any of Examples 1-14.

Example 16: A method including (i) transmitting a drive signal to a driver circuit of an optical element, the optical element including a primary electrode, a secondary electrode overlapping at least a portion of the primary electrode, and an electroactive layer disposed between and abutting the primary electrode and the secondary electrode, wherein the electroactive layer is located within a transparent aperture of the optical element, and (ii) actuating the electroactive layer by applying the drive signal to at least one of the primary electrode and the secondary electrode, wherein the drive signal is transmitted by a voltage amplifier or a power amplifier electrically connected to the driver circuit.

Example 17: The method of Example 17, wherein the drive signal includes multiple frequencies.

Example 18: A method including (i) transmitting a drive signal to a driver circuit of an optical element, the optical element including a primary electrode, a secondary electrode overlapping at least a portion of the primary electrode, and an electroactive layer disposed between and abutting the primary electrode and the secondary electrode, wherein the electroactive layer is located within a transparent aperture of the optical element, (ii) actuating the electroactive layer by applying the drive signal to at least one of the primary electrode and the secondary electrode, and (iii) sensing a condition of the optical element using a sensing element coupled to the driver circuit.

Example 19: The method of Example 18, wherein the drive signal is transmitted by a voltage amplifier or a power amplifier electrically connected to the driver circuit.

Example 20: The method of any of Examples 18 or 19, wherein the sensing element includes an amplifying element, a zero-adjust element, or a monitor element.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs), an example of which is augmented-reality system 2400 in FIG. 24. Other artificial reality systems may include a NED that also provides visibility into the real world (e.g., augmented-reality system 2500 in FIG. 25) or that visually immerses a user in an artificial reality (e.g., virtual-reality system 2600 in FIG. 26). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 24:
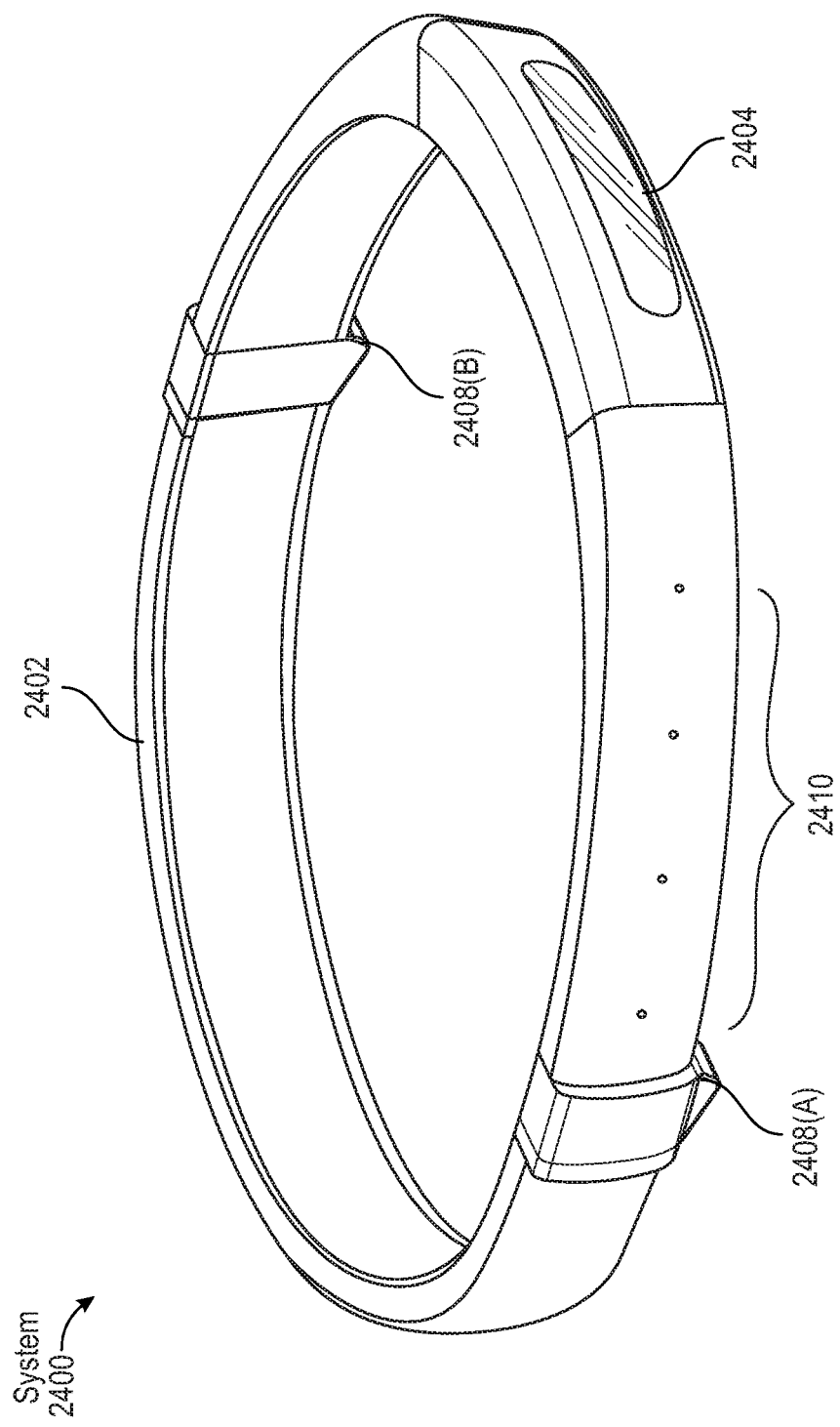
FIG. 24 is an illustration of an exemplary artificial-reality headband that may be used in connection with embodiments of this disclosure.

Turning to FIG. 24, augmented-reality system 2400 generally represents a wearable device dimensioned to fit about a body part (e.g., a head) of a user. As shown in FIG. 24, system 2400 may include a frame 2402 and a camera assembly 2404 that is coupled to frame 2402 and configured to gather information about a local environment by observing the local environment. Augmented-reality system 2400 may also include one or more audio devices, such as output audio transducers 2408(A) and 2408(B) and input audio transducers 2410. Output audio transducers 2408(A) and 2408(B) may provide audio feedback and/or content to a user, and input audio transducers 2410 may capture audio in a user's environment.

As shown, augmented-reality system 2400 may not necessarily include a NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 2400 may not include a NED, augmented-reality system 2400 may include other types of screens or visual feedback devices (e.g., a display screen integrated into a side of frame 2402).

Figure 25:
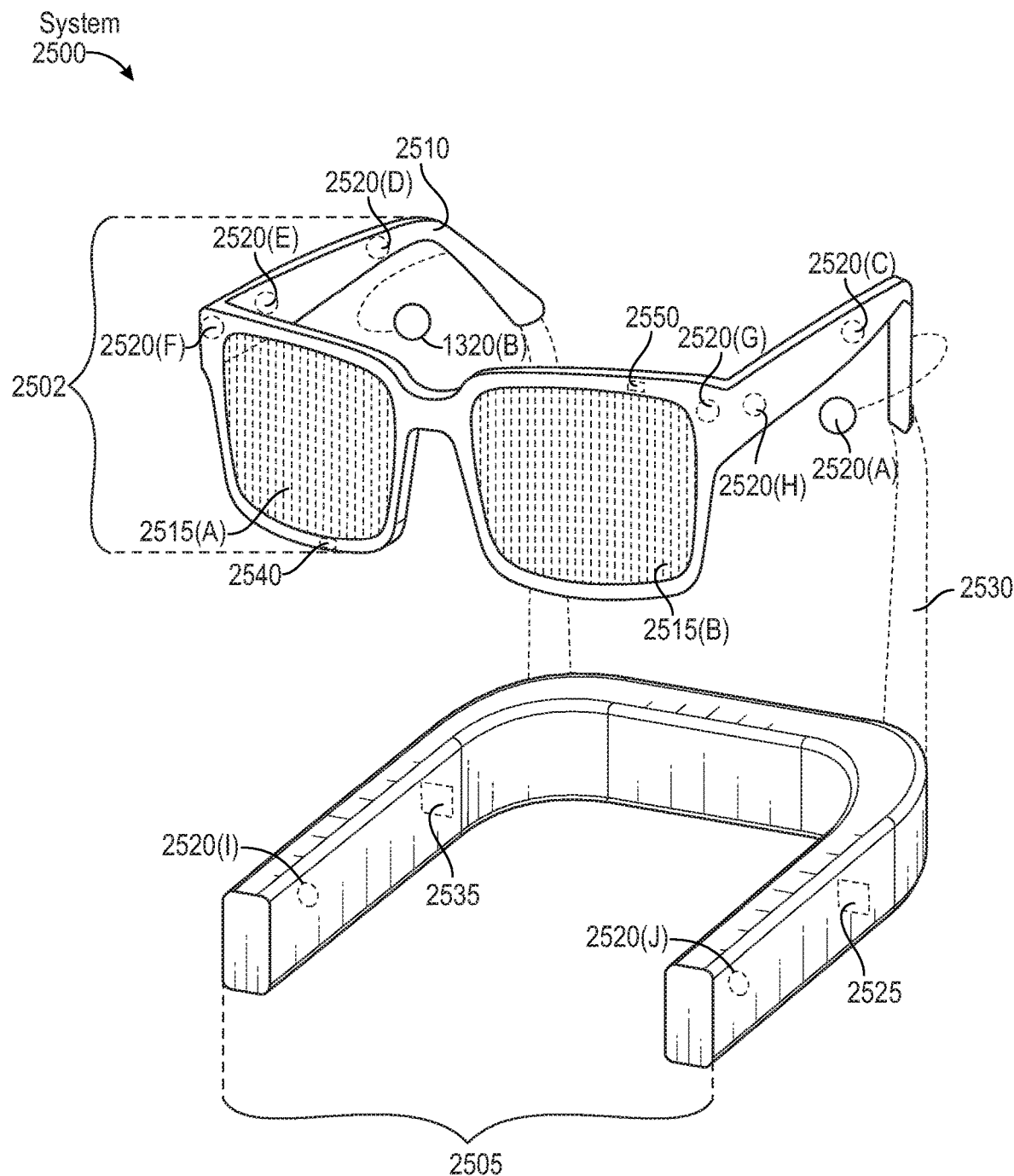
FIG. 25 is an illustration of exemplary augmented-reality glasses that may be used in connection with embodiments of this disclosure.

The embodiments discussed in this disclosure may also be implemented in augmented-reality systems that include one or more NEDs. For example, as shown in FIG. 25, augmented-reality system 2500 may include an eyewear device 2502 with a frame 2510 configured to hold a left display device 2515(A) and a right display device 2515(B) in front of a user's eyes. Display devices 2515(A) and 2515(B) may act together or independently to present an image or series of images to a user. While augmented-reality system 2500 includes two displays, embodiments of this disclosure may be implemented in augmented-reality systems with a single NED or more than two NEDs.

In some embodiments, augmented-reality system 2500 may include one or more sensors, such as sensor 2540. Sensor 2540 may generate measurement signals in response to motion of augmented-reality system 2500 and may be located on substantially any portion of frame 2510. Sensor 2540 may represent a position sensor, an inertial measurement unit (IMU), a depth camera assembly, or any combination thereof. In some embodiments, augmented-reality system 2500 may or may not include sensor 2540 or may include more than one sensor. In embodiments in which sensor 2540 includes an IMU, the IMU may generate calibration data based on measurement signals from sensor 2540. Examples of sensor 2540 may include, without limitation, accelerometers, gyroscopes, magnetometers, other suitable types of sensors that detect motion, sensors used for error correction of the IMU, or some combination thereof.

Augmented-reality system 2500 may also include a microphone array with a plurality of acoustic transducers 2520(A)-2520(J), referred to collectively as acoustic transducers 2520. Acoustic transducers 2520 may be transducers that detect air pressure variations induced by sound waves. Each acoustic transducer 2520 may be configured to detect sound and convert the detected sound into an electronic format (e.g., an analog or digital format). The microphone array in FIG. 25 may include, for example, ten acoustic transducers: 2520(A) and 2520(B), which may be designed to be placed inside a corresponding ear of the user, acoustic transducers 2520(C), 2520(D), 2520(E), 2520(F), 2520(G), and 2520(H), which may be positioned at various locations on frame 2510, and/or acoustic transducers 2520(I) and 2520(J), which may be positioned on a corresponding neckband 2505.

In some embodiments, one or more of acoustic transducers 2520(A)-(J) may be used as output transducers (e.g., speakers). For example, acoustic transducers 2520(A) and/or 2520(B) may be earbuds or any other suitable type of headphone or speaker.

The configuration of acoustic transducers 2520 of the microphone array may vary. While augmented-reality system 2500 is shown in FIG. 25 as having ten acoustic transducers 2520, the number of acoustic transducers 2520 may be greater or less than ten. In some embodiments, using higher numbers of acoustic transducers 2520 may increase the amount of audio information collected and/or the sensitivity and accuracy of the audio information. In contrast, using a lower number of acoustic transducers 2520 may decrease the computing power required by the controller 2550 to process the collected audio information. In addition, the position of each acoustic transducer 2520 of the microphone array may vary. For example, the position of an acoustic transducer 2520 may include a defined position on the user, a defined coordinate on frame 2510, an orientation associated with each acoustic transducer, or some combination thereof.

Acoustic transducers 2520(A) and 2520(B) may be positioned on different parts of the user's ear, such as behind the pinna or within the auricle or fossa. Or, there may be additional acoustic transducers on or surrounding the ear in addition to acoustic transducers 2520 inside the ear canal. Having an acoustic transducer positioned next to an ear canal of a user may enable the microphone array to collect information on how sounds arrive at the ear canal. By positioning at least two of acoustic transducers 2520 on either side of a user's head (e.g., as binaural microphones), augmented-reality device 2500 may simulate binaural hearing and capture a 3D stereo sound field around about a user's head. In some embodiments, acoustic transducers 2520(A) and 2520(B) may be connected to augmented-reality system 2500 via a wired connection 2530, and in other embodiments, acoustic transducers 2520(A) and 2520(B) may be connected to augmented-reality system 2500 via a wireless connection (e.g., a Bluetooth connection). In still other embodiments, acoustic transducers 2520(A) and 2520(B) may not be used at all in conjunction with augmented-reality system 2500.

Acoustic transducers 2520 on frame 2510 may be positioned along the length of the temples, across the bridge, above or below display devices 2515(A) and 2515(B), or some combination thereof. Acoustic transducers 2520 may be oriented such that the microphone array is able to detect sounds in a wide range of directions surrounding the user wearing the augmented-reality system 2500. In some embodiments, an optimization process may be performed during manufacturing of augmented-reality system 2500 to determine relative positioning of each acoustic transducer 2520 in the microphone array.

In some examples, augmented-reality system 2500 may include or be connected to an external device (e.g., a paired device), such as neckband 2505. Neckband 2505 generally represents any type or form of paired device. Thus, the following discussion of neckband 2505 may also apply to various other paired devices, such as charging cases, smart watches, smart phones, wrist bands, other wearable devices, hand-held controllers, tablet computers, laptop computers and other external compute devices, etc.

As shown, neckband 2505 may be coupled to eyewear device 2502 via one or more connectors. The connectors may be wired or wireless and may include electrical and/or non-electrical (e.g., structural) components. In some cases, eyewear device 2502 and neckband 2505 may operate independently without any wired or wireless connection between them. While FIG. 25 illustrates the components of eyewear device 2502 and neckband 2505 in example locations on eyewear device 2502 and neckband 2505, the components may be located elsewhere and/or distributed differently on eyewear device 2502 and/or neckband 2505. In some embodiments, the components of eyewear device 2502 and neckband 2505 may be located on one or more additional peripheral devices paired with eyewear device 2502, neckband 2505, or some combination thereof.

Pairing external devices, such as neckband 2505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 2500 may be provided by a paired device or shared between a paired device and an eyewear device, thus reducing the weight, heat profile, and form factor of the eyewear device overall while still retaining desired functionality. For example, neckband 2505 may allow components that would otherwise be included on an eyewear device to be included in neckband 2505 since users may tolerate a heavier weight load on their shoulders than they would tolerate on their heads. Neckband 2505 may also have a larger surface area over which to diffuse and disperse heat to the ambient environment. Thus, neckband 2505 may allow for greater battery and computation capacity than might otherwise have been possible on a stand-alone eyewear device. Since weight carried in neckband 2505 may be less invasive to a user than weight carried in eyewear device 2502, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 2505 may be communicatively coupled with eyewear device 2502 and/or to other devices. These other devices may provide certain functions (e.g., tracking, localizing, depth mapping, processing, storage, etc.) to augmented-reality system 2500. In the embodiment of FIG. 25, neckband 2505 may include two acoustic transducers (e.g., 2520(I) and 2520(J)) that are part of the microphone array (or potentially form their own microphone subarray). Neckband 2505 may also include a controller 2525 and a power source 2535.

Acoustic transducers 2520(I) and 2520(J) of neckband 2505 may be configured to detect sound and convert the detected sound into an electronic format (analog or digital). In the embodiment of FIG. 25, acoustic transducers 2520(I) and 2520(J) may be positioned on neckband 2505, thereby increasing the distance between the neckband acoustic transducers 2520(I) and 2520(J) and other acoustic transducers 2520 positioned on eyewear device 2502. In some cases, increasing the distance between acoustic transducers 2520 of the microphone array may improve the accuracy of beamforming performed via the microphone array. For example, if a sound is detected by acoustic transducers 2520(C) and 2520(D) and the distance between acoustic transducers 2520(C) and 2520(D) is greater than, e.g., the distance between acoustic transducers 2520(D) and 2520(E), the determined source location of the detected sound may be more accurate than if the sound had been detected by acoustic transducers 2520(D) and 2520(E).

Controller 2525 of neckband 2505 may process information generated by the sensors on neckband 2505 and/or augmented-reality system 2500. For example, controller 2525 may process information from the microphone array that describes sounds detected by the microphone array. For each detected sound, controller 2525 may perform a direction-of-arrival (DOA) estimation to estimate a direction from which the detected sound arrived at the microphone array. As the microphone array detects sounds, controller 2525 may populate an audio data set with the information.

In embodiments in which augmented-reality system 2500 includes an inertial measurement unit, controller 2525 may compute all inertial and spatial calculations from the IMU located on eyewear device 2502. A connector may convey information between augmented-reality system 2500 and neckband 2505 and between augmented-reality system 2500 and controller 2525. The information may be in the form of optical data, electrical data, wireless data, or any other transmittable data form. Moving the processing of information generated by augmented-reality system 2500 to neckband 2505 may reduce weight and heat in eyewear device 2502, making it more comfortable to the user.

Power source 2535 in neckband 2505 may provide power to eyewear device 2502 and/or to neckband 2505. Power source 2535 may include, without limitation, lithium ion batteries, lithium-polymer batteries, primary lithium batteries, alkaline batteries, or any other form of power storage. In some cases, power source 2535 may be a wired power source. Including power source 2535 on neckband 2505 instead of on eyewear device 2502 may help better distribute the weight and heat generated by power source 2535.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 2600 in FIG. 26, that mostly or completely covers a user's field of view. Virtual-reality system 2600 may include a front rigid body 2602 and a band 2604 shaped to fit around a user's head. Virtual-reality system 2600 may also include output audio transducers 2606(A) and 2606(B). Furthermore, while not shown in FIG. 26, front rigid body 2602 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 2600 and/or virtual-reality system 2600 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 2500 and/or virtual-reality system 2600 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 2400, augmented-reality system 2500, and/or virtual-reality system 2600 may include one or more optical sensors, such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 24 and 26, output audio transducers 2408(A), 2408(B), 2606(A), and 2606(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 2410 may include condenser microphones, dynamic microphones, ribbon microphones, and/or any other type or form of input transducer. In some embodiments, a single transducer may be used for both audio input and audio output.

While not shown in FIGS. 24-26, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A transparent optical element comprising:
a primary electrode;
a secondary electrode overlapping at least a portion of the primary electrode;
an electroactive layer disposed between and abutting the primary electrode and the secondary electrode; and
a control system operably coupled to at least one of the primary electrode and the secondary electrode and adapted to provide a drive signal to actuate the electroactive layer within an aperture of the transparent optical element, wherein the electroactive layer has a transmissivity of at least 75% and less than 10% haze.

2. The transparent optical element of claim 1, wherein the electroactive layer comprises a material selected from the group consisting of a dielectric elastomer, a piezoelectric polymer, an electrostrictive polymer, a piezoelectric ceramic, an electrostrictive ceramic, a piezoelectric single crystal, and an electrostrictive single crystal.

3. The transparent optical element of claim 1, wherein the control system comprises at least one of an open-loop circuit, a feed-forward circuit, or a closed-loop circuit.

4. The transparent optical element of claim 1, wherein the control system comprises a driver circuit, and the driver circuit is current driven, charge driven, voltage driven, or a combination of current, charge, and voltage driven.

5. The transparent optical element of claim 4, wherein the driver circuit comprises a series driver circuit, a parallel driver circuit, a unipolar driver circuit, or a bipolar driver circuit.

6. The transparent optical element of claim 4, further comprising a voltage amplifier or a power amplifier configured to provide the drive signal to the driver circuit.

7. The transparent optical element of claim 6, wherein the power amplifier comprises a switching amplifier.

8. The transparent optical element of claim 6, wherein the drive signal comprises multiple frequencies.

9. The transparent optical element of claim 1, further comprising a sensing element located within the aperture.

10. The transparent optical element of claim 9, wherein the sensing element comprises an in-field illumination source.

11. The transparent optical element of claim 1, wherein the primary electrode comprises a plurality of independently-addressable electrodes, a first portion of the independently-addressable electrodes electrically connected to a driver circuit and a second portion of the independently-addressable electrodes electrically connected to a sensing circuit.

12. The transparent optical element of claim 1, further comprising a sensing element located outside the aperture.

13. The transparent optical element of claim 12, wherein the sensing element is electrically connected to a control circuit comprising a P control loop, a P-I control loop, a P-D control loop, or a P-I-D control loop.

14. A head-mounted display comprising the transparent optical element of claim 1.

15. A method comprising:
transmitting a drive signal to a driver circuit of an optical element, the optical element comprising:
a primary electrode;
a secondary electrode overlapping at least a portion of the primary electrode; and
an electroactive layer disposed between and abutting the primary electrode and the secondary electrode, wherein the electroactive layer has a transmissivity of at least 75% and less than 10% haze and is located within a transparent aperture of the optical element; and
actuating the electroactive layer by applying the drive signal to at least one of the primary electrode and the secondary electrode, wherein the drive signal is transmitted by a voltage amplifier or a power amplifier electrically connected to the driver circuit.

16. The method of claim 15, wherein the drive signal comprises multiple frequencies.

17. A method comprising:
transmitting a drive signal to a driver circuit of an optical element, the optical element comprising:
a primary electrode;
a secondary electrode overlapping at least a portion of the primary electrode; and
an electroactive layer disposed between and abutting the primary electrode and the secondary electrode, wherein the electroactive layer has a transmissivity of at least 75% and less than 10% haze and is located within a transparent aperture of the optical element;
actuating the electroactive layer by applying the drive signal to at least one of the primary electrode and the secondary electrode; and
sensing a condition of the optical element using a sensing element coupled to the driver circuit.

18. The method of claim 17, wherein the drive signal is transmitted by a voltage amplifier or a power amplifier electrically connected to the driver circuit.

19. The method of claim 17, wherein the sensing element comprises an amplifying element, a zero-adjust element, or a monitor element.

* * * * *